(12) United States Patent
Rad et al.

(10) Patent No.: US 10,203,854 B2
(45) Date of Patent: *Feb. 12, 2019

(54) MATCHING PROCESS SYSTEM AND METHOD

(71) Applicant: Match Group, LLC, Dallas, TX (US)

(72) Inventors: Sean Rad, Los Angeles, CA (US);
Todd M. Carrico, Sachse, TX (US);
Kenneth B. Hoskins, Plano, TX (US);
James C. Stone, Addison, TX (US);
Jonathan Badeen, North Hollywood, CA (US)

(73) Assignee: Match Group, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,542

(22) Filed: Apr. 3, 2018

(65) Prior Publication Data

US 2018/0292981 A1    Oct. 11, 2018

Related U.S. Application Data

(63) Continuation of application No. 15/676,773, filed on Aug. 14, 2017, which is a continuation of application
(Continued)

(51) Int. Cl.
*G06F 17/30* (2006.01)
*G06F 3/0484* (2013.01)
(Continued)

(52) U.S. Cl.
CPC ........ *G06F 3/04842* (2013.01); *G06F 3/0482* (2013.01); *G06F 3/0488* (2013.01);
(Continued)

(58) Field of Classification Search
CPC .......... G06F 17/30867; G06F 17/3053; G06F 17/30386

See application file for complete search history.

(56) References Cited

U.S. PATENT DOCUMENTS

| 6,480,885 | B1 | 11/2002 | Olivier |
| 7,917,448 | B2 | 3/2011 | Smola et al. |

(Continued)

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US08/87706, dated Feb. 10, 2009, 8 pages.

(Continued)

*Primary Examiner* — Yuk Ting Choi
(74) *Attorney, Agent, or Firm* — Baker Botts L.L.P.

(57) ABSTRACT

A method for profile matching includes receiving a plurality of user profiles, each user profile comprising traits of a respective user. The method includes receiving a preference indication for a first user profile of the plurality of user profiles. The method also includes determining a potential match user profile of the plurality of user profiles based on the preference indication for the first user profile. The method also includes presenting the potential match user profile to a second user.

12 Claims, 11 Drawing Sheets

Related U.S. Application Data

No. 14/059,192, filed on Oct. 21, 2013, now Pat. No. 9,733,811, which is a continuation-in-part of application No. 12/339,301, filed on Dec. 19, 2008, now Pat. No. 8,566,327.

(60) Provisional application No. 61/793,866, filed on Mar. 15, 2013, provisional application No. 61/015,099, filed on Dec. 19, 2007.

(51) Int. Cl.
| | |
|---|---|
| *G06Q 10/10* | (2012.01) |
| *G06Q 30/02* | (2012.01) |
| *G06Q 50/10* | (2012.01) |
| *G06Q 50/00* | (2012.01) |
| *G06F 3/0482* | (2013.01) |
| *G06F 3/0488* | (2013.01) |

(52) U.S. Cl.
CPC .. *G06F 17/30554* (2013.01); *G06F 17/30657* (2013.01); *G06Q 10/10* (2013.01); *G06Q 30/02* (2013.01); *G06Q 50/01* (2013.01); *G06Q 50/10* (2013.01)

(56) References Cited

U.S. PATENT DOCUMENTS

| | | | |
|---|---|---|---|
| 8,060,463 | B1 | 11/2011 | Spiegel |
| 8,180,804 | B1 | 5/2012 | Narayanan et al. |
| 8,566,327 | B2 | 10/2013 | Carrico et al. |
| 9,547,369 | B1 | 1/2017 | Wernick et al. |
| 9,720,570 | B2 | 8/2017 | Wernick et al. |
| 2005/0021750 | A1 | 1/2005 | Abrams |
| 2005/0027707 | A1 | 2/2005 | Syed |
| 2006/0059147 | A1 | 3/2006 | Weiss et al. |
| 2006/0085419 | A1 | 4/2006 | Rosen |
| 2006/0106780 | A1 | 5/2006 | Dagan |
| 2007/0073687 | A1 | 3/2007 | Terrill et al. |
| 2007/0073803 | A1 | 3/2007 | Terrill et al. |
| 2008/0051033 | A1* | 2/2008 | Hymes ............ G06F 17/30247 455/47 |
| 2008/0196094 | A1* | 8/2008 | Benschop ............ G06Q 20/10 726/5 |
| 2008/0294624 | A1 | 11/2008 | Kanigsberg et al. |
| 2008/0301118 | A1 | 12/2008 | Chien et al. |
| 2009/0106040 | A1 | 4/2009 | Jones |
| 2010/0125632 | A1 | 5/2010 | Leonard |
| 2011/0087974 | A1 | 4/2011 | Kulas |
| 2011/0196927 | A1 | 8/2011 | Vance |
| 2012/0088524 | A1* | 4/2012 | Moldavsky ............ G06Q 30/02 455/456.3 |
| 2014/0040368 | A1 | 2/2014 | Janssens |
| 2014/0074824 | A1 | 3/2014 | Rad |

OTHER PUBLICATIONS

USPTO, Non-final Office Action dated Aug. 25, 2011 for U.S. Appl. No. 12/339,301, filed Dec. 19, 2008 in the name of Todd M. Carrico, 14 pages.

Response to Office Action Pursuant to 37 C.F.R. § 1.111 filed Nov. 23, 2011 for U.S. Appl. No. 12/339,301, filed Dec. 19, 2008 in the name of Todd M. Carrico, 12 pages.

USPTO, Final Office Action dated Jan. 6, 2012 for U.S. Appl. No. 12/339,301, filed Dec. 19, 2008 in the name of Todd M. Carrico, 15 pages.

Request for Continued Examination Transmittal and Amendment Filed with Request for Continued Examination filed May 7, 2012 for U.S. Appl. No. 12/339,301, filed Dec. 19, 2008 in the name of Todd M. Carrico, 17 pages.

USPTO, Non-final Office Action dated Oct. 2, 2012 for U.S. Appl. No. 12/339,301, filed Dec. 19, 2008 in the name of Todd M. Carrico, 10 pages.

Response to Office Action Pursuant to 37 C.F.R. § 1.111 filed Dec. 31, 2012 for U.S. Appl. No. 12/339,301, filed Dec. 19, 2008 in the name of Todd M. Carrico, 13 pages.

USPTO, Final Office Action dated Mar. 7, 2013 for U.S. Appl. No. 12/339,301, filed Dec. 19, 2008 in the name of Todd M. Carrico, 12 pages.

Response to Office Action Pursuant to 37 C.F.R. § 1.116 and Certification and Request for Consideration Under the After Final Consideration Pilot Program 2.0 filed Jun. 6, 2013 for U.S. Appl. No. 12/339,301, filed Dec. 19, 2008 in the name of Todd M. Carrico, 14 pages.

USPTO, Notice of Allowance and Fees Due dated Jun. 19, 2013 for U.S. Appl. No. 12/339,301, filed Dec. 19, 2008 in the name of Todd M. Carrico, 12 pages.

* cited by examiner

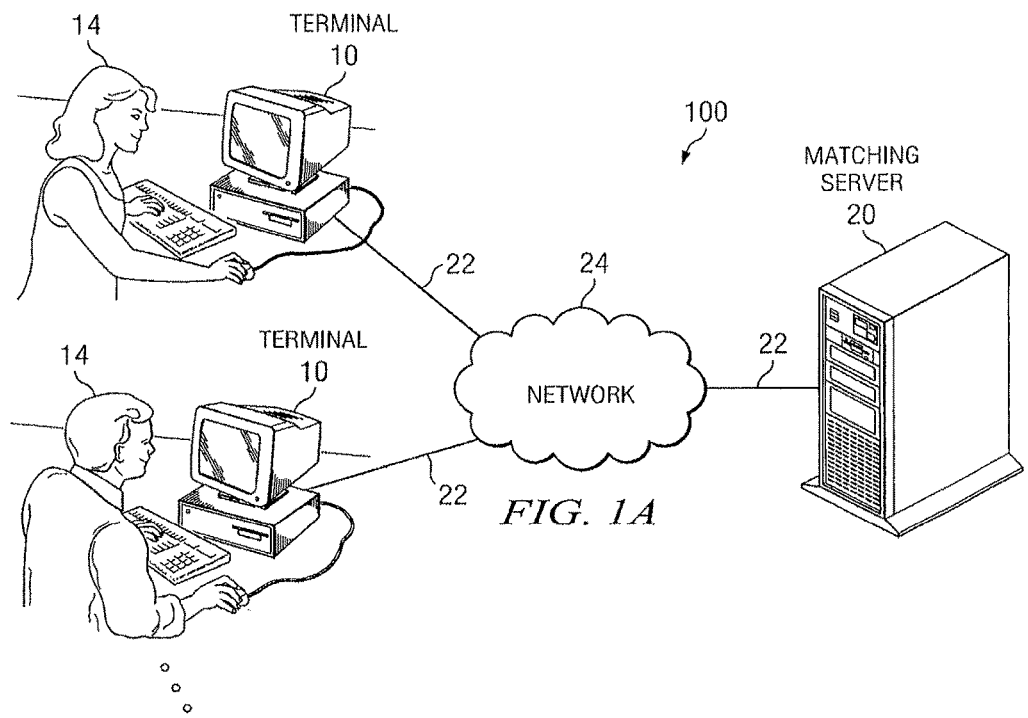
FIG. 1A
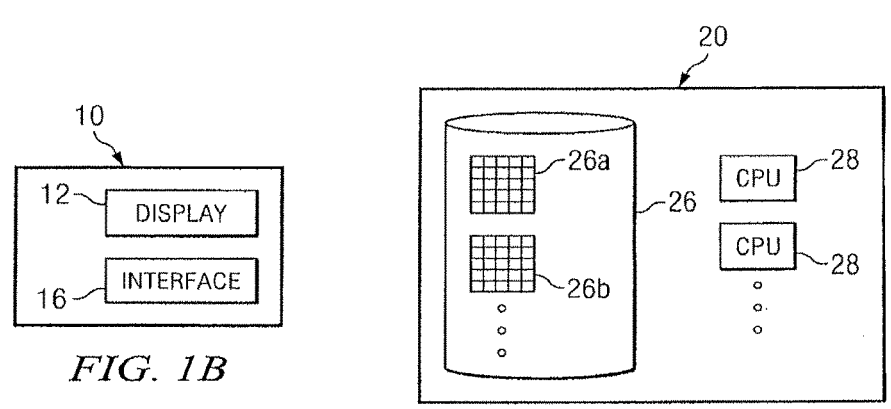
FIG. 1B
FIG. 1C

| NAME | PROPERTY 1 | PROPERTY 2 | ○ ○ ○ |
|---|---|---|---|
| Jane Doe — 30a<br>Jane Roe — 30b<br>30 { Jane Boe — 30c<br>Jane Loe — 30d<br>Jane Snoe — 30e<br>○<br>○<br>○ | | | ○ ○ ○ |
26a
*FIG. 1D*
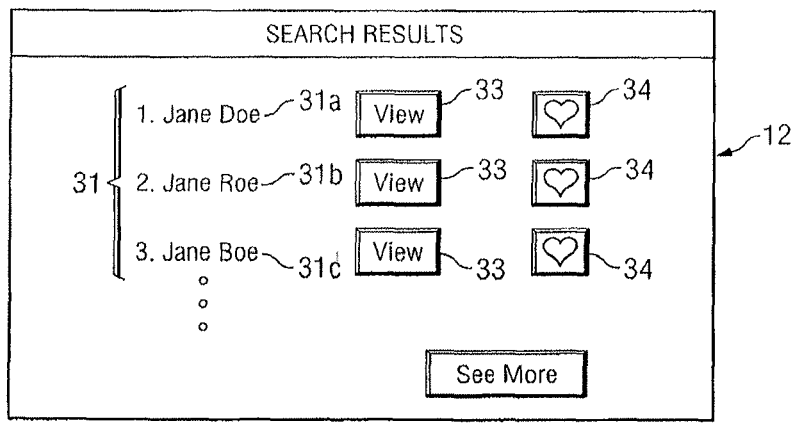
*FIG. 1E*
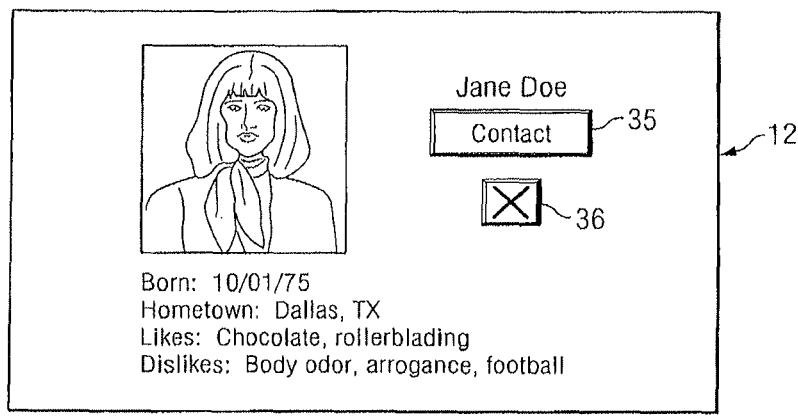
*FIG. 1F*

MATCHING PROCESS SYSTEM AND METHOD

RELATED APPLICATION

This application is a continuation of U.S. application Ser. No. 15/676,773 filed Aug. 14, 2017 and entitled "Matching Process System And Method," which is a continuation of U.S. application Ser. No. 14/059,192 filed Oct. 21, 2013 and entitled "Matching Process System and Method;" which (a) is a continuation-in-part of U.S. application Ser. No. 12/339,301 filed Dec. 19, 2008 and entitled "Matching Process System and Method," now U.S. Pat. No. 8,566,327, which claims benefit under 35 U.S.C. § 119(e) to U.S. Provisional Application Ser. No. 61/015,099, entitled "Matching Process System And Method," filed Dec. 19, 2007; and (b) claims benefit under 35 U.S.C. 119(e) to U.S. Provisional Application Ser. No. 61/793,866 filed Mar. 15, 2013 and entitled "Social Matching System and Method."

TECHNICAL FIELD

This invention relates generally to computer matching systems and more particularly to a matching process system and method.

BACKGROUND

Networking architectures have grown increasingly complex in communications environments. In recent years, a series of protocols and configurations have been developed in order to accommodate a diverse group of end users having various networking needs. Many of these architectures have gained significant notoriety because they can offer the benefits of automation, convenience, management, and enhanced consumer selections.

Certain network protocols may be used in order to allow an end user to conduct an on-line search of candidates to fill a given vacancy. These protocols may relate to job searches, person finding services, real estate searches, or on-line dating. While some believe that on-line dating is simply a matter of matching supply and demand, there is statistical and empirical evidence to suggest that successful on-line dating entails far more.

For example, people having similar and/or compatible character traits and values should be matched together. However, effectively linking two participants together can prove to be a challenging endeavor. Coordinating a relationship between two like-minded individuals can be a significant chore, as there are a number of obstacles and barriers that must be overcome.

One problem that has arisen is that matching services are limited to searching for matches only within their own platform. Thus, only people who have gone through the process of signing up for the service are searched for a match. One solution to this problem is to have users register in multiple services. This is problematic because it can be expensive and time consuming for users. Further, the user must then visit all of the services to monitor the search progress: this inefficiency may cause users to give up on the search process.

Another problem is that the search results of these services contain many irrelevant entities to the searcher. This costs the user of the service time and may deter them from continuing through all of the search results.

Another problem is that large numbers of unwanted communication requests can become a nuisance to the user. Too many nuisance requests may deter the user from further use of the system. Users with the most attractive profiles are oftentimes the ones that receive the most unwanted attention. If the users with the most attractive profiles cease to use the system, the quality of the user pool deteriorates.

SUMMARY

In one embodiment, a method for profile matching comprises receiving a plurality of user profiles, each user profile comprising traits of a respective user. It also comprises receiving a preference indication for a first user profile of the plurality of user profiles. It further comprises determining a potential match user profile of the plurality of user profiles based on the preference indication for the first user profile. The method also comprises presenting the potential match user profile to a second user.

Receiving a preference indication for a first user profile may include receiving from a third user a recommendation of the first user profile for the second user. It may also include receiving from the second user a preference indication for the first user profile. The method may further include determining a score of a third user profile of the plurality of user profiles as a potential match for the second user. It may also include altering the score of the third user profile based on the preference indication for the first user profile.

In another embodiment, a method for profile matching comprises receiving a plurality of user profiles, each user profile comprising traits of a respective user. The method further comprises receiving a request for matches from a first user, the first user associated with a first user profile. The method also comprises scoring the plurality of user profiles for potential matching with the first user based on comparisons of the plurality of user profiles with the first user profile. It also comprises identifying a second user profile of the plurality of user profiles as a potential match for the first user based on the scoring. The method further comprises identifying commonality between a third user profile of the plurality of user profiles and the second user profile. In addition, the method comprises presenting to the first user the third user profile as a potential match for the first user.

Depending on the specific features implemented, particular embodiments may exhibit some, none, or all of the following technical advantages. Various embodiments may be capable of dynamically updating match search results based on user activity. Some embodiments may be capable of enhancing match search results by reducing the impact of restrictive user preferences. In addition, some embodiments may provide the ability to evaluate the attractiveness of potential matches. Various embodiments may be capable of importing user profiles from other social-networking systems. Some embodiments may be capable of generating the pool of users based on both explicit and implicit criteria derived from other social networking systems. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts, and which:

FIG. 1A is an overview of one embodiment of the matching system;

FIG. 1B shows the contents of the terminal from FIG. 1A;

FIG. 1C shows the contents of the matching server from FIG. 1A;

FIG. 1D is a diagram of a database from FIG. 1C showing one embodiment of how a matching server stores a pool;

FIG. 1E is a diagram of the display from FIG. 1B showing one embodiment of the presentation of search results to a user;

FIG. 1F is a diagram of the display from FIG. 1B showing one embodiment of the presentation of details of a match result entity to a user;

DETAILED DESCRIPTION

Figure 2:
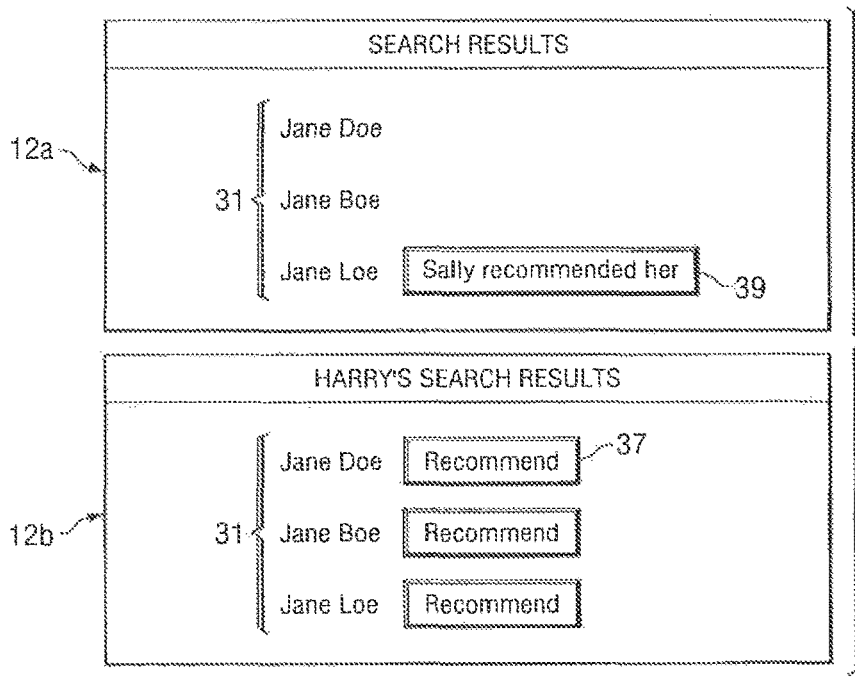
FIG. 2 is a diagram depicting how a user may recommend an entity to another user, in accordance with a particular embodiment.

Referring to FIG. 1A, one embodiment of a matching system is shown. FIG. 1A is a simplified block diagram of a system 100 for facilitating an on-line dating scenario in a network environment. In other embodiments, system 100 can be leveraged to identify and to evaluate suitable candidates in other areas (e.g. hiring/employment, recruiting, real estate, general person searches, etc.). Users 14 interact with a matching server 20 through terminals 10. FIG. 1B is a diagram showing, in one embodiment, the contents of terminal 10. Terminal 10 comprises interface 16 (so that user 14 may be able to interact with terminal 10) and display 12. FIG. 1C is a diagram showing, in one embodiment, the contents of matching server 20. Matching server 20 comprises memory 26 and at least one CPU 28. Memory 26 may store multiple databases, such as databases 26a and 26b. Terminal 10 and matching server 20 are communicatively coupled via network connections 22 and network 24.

Users 14 are clients, customers, prospective customers, or entities wishing to participate in an on-line dating scenario and/or to view information associated with other participants in the system. Users 14 may also seek to access or to initiate a communication with other users that may be delivered via network 24. Users 14 may review data (such as profiles, for example) associated with other users in order to make matching decisions or elections. Data, as used herein, refers to any type of numeric, voice, video, text, or script data, or any other suitable information in any appropriate format that may be communicated from one point to another.

In one embodiment, terminal 10 represents (and is inclusive of) a personal computer that may be used to access network 24. Alternatively, terminal 10 may be representative of a cellular telephone, an electronic notebook, a laptop, a personal digital assistant (PDA), or any other suitable device (wireless or otherwise: some of which can perform web browsing), component, or element capable of accessing one or more elements within system 100. Interface 16, which may be provided in conjunction with the items listed above, may further comprise any suitable interface for a human user such as a video camera, a microphone, a keyboard, a mouse, or any other appropriate equipment according to particular configurations and arrangements. In addition, interface may be a unique element designed specifically for communications involving system 100. Such an element may be fabricated or produced specifically for matching applications involving a user.

Display 12, in one embodiment, is a computer monitor. Alternatively, display 12 may be a projector, speaker, or other device that allows user 14 to appreciate information that system 100 transmits.

Network 24 is a communicative platform operable to exchange data or information emanating from user 14. Network 24 could be a plain old telephone system (POTS). Transmission of information emanating from the user may be assisted by management associated with matching server 20 or manually keyed into a telephone or other suitable electronic equipment. In other embodiments, network 24 could be any packet data network offering a communications interface or exchange between any two nodes in system 100. Network 24 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment, including a combination of any networks or systems described above. In various embodiments, network connections 22 may include, but are not limited to, wired and/or wireless mediums which may be provisioned with routers and firewalls.

Matching server 20 is operable to receive and to communicate information to terminal 10. In some embodiments, matching server 20 may comprise a plurality of servers or other equipment, each performing different or the same functions in order to receive and communicate information to terminal 10. Matching server 20 may include software and/or algorithms to achieve the operations for processing, communicating, delivering, gathering, uploading, maintaining, and/or generally managing data, as described herein. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations.

In some embodiments, user 14, using terminal 10, registers with matching server 20. Registration may include user 14 submitting information to matching server 20 about user 14 as well as characteristics user 14 is seeking to be matched with. Such information may include a user handle, which may be a combination of characters that uniquely identifies user 14 to matching server 20. In various embodiments, matching server 20 may be configured to collect this information; for example, matching server 20 may be configured to ask user 14 to respond to a series of questions. Matching server 20 may be configured to receive the information submitted by user 14 and create a profile for user 14 based on that information, storing the profile in memory 26.

As an example only, consider a case where user 14 is interested in participating in an on-line dating scenario. User 14 can access the Internet via terminal 10, travel to a web site managed by matching server 20, and begin the registration process. As part of the registration process, matching server 20 may ask user 14 a series of questions which identifies characteristics about user 14. Thus, matching server 20 may ask about the height, weight, age, location, and ethnicity of user 14. It may also ask about the birthplace, parents, eating habits, activities, and goals of user 14. Matching server 20 may further use the registration process to discover what user 14 may be looking for in a match, such as age, weight, height, location, ethnicity, diet, education, etc. Further, matching server 20 may ask user 14 to indicate how important certain factors are when looking for a match. For example, matching server 20 may allow the user to indicate which characteristics in a potential match are a necessity. In another example, matching server 20 may ask, "How important is it that your match does not smoke?" Matching server 20 may also allow the user to indicate that certain characteristics are not important search criteria. For example, when asking user 14 about what height or weight user 14 is seeking in a match, matching server 20 may be configured to receive "not important" as a response. In yet another example, matching server 20 may allow user 14 to rate which factors are important on a numerical scale. For example, matching server 20 may ask user 14 the following: "On a scale of 1-10, how important is it that your match has the same education level as you?" In some embodiments, matching server 20 may specify that any number of questions or requested descriptions are necessary before registration may be concluded. As an example only, matching server 20 may require that user 14 communicate the sex of user 14 and the sex user 14 prefers to be matched with. After concluding the registration process, matching server 20 may store the responses of user 14 as a profile. This same process may be repeated by several different users 14, causing matching server 20 to contain a plurality of profiles.

FIG. 1D depicts an embodiment in which matching server 20 has a database 26a which contains a pool 30. Each entry in database 26a has a pool entity 30a along with information concerning that entity. In one embodiment, each pool entity 30a-e represents a user and their profile. In some embodiments, not all registered users are in pool 30. As discussed further below, matching server 20 may use a selection process for including stored profiles in pool 30. As depicted in FIG. 1D, in this embodiment, the collection of users and profiles forms pool 30 through which matching server may perform various functions such as searches for matches.

Matching server 20 may be configured to search through pool 30 and present matches to user 14. In FIG. 1E, one embodiment of this presentation is depicted as occurring through display 12. In various embodiments, matches may be presented to user 14 utilizing other communication schemes, such as electronic messages (i.e., e-mail) or text messages (i.e., utilizing SMS). In the depicted embodiment, a result list 31 is presented to user 14. A match result entity 31a in a result list 31 may be associated with a view button 33. Using interface 16, user 14 may request that matching server 20 provide more information about an entity in result list 31 by pressing the associated view button 33. Matching server 20 may then communicate to user 14 more information about that entity by retrieving the information from memory 26. In FIG. 1F, one embodiment of information that matching server 20 provides for user 14 is shown. Using display 12, user 14 views an entity from result list 31. Matching server 20 may also provide user 14 with the ability to contact the entity through a contact button 35. In one embodiment, when contact button 35 is utilized by user 14, matching server 20 may provide user 14 with contact information of the entity such as a telephone number or an e-mail address; in another embodiment, matching server 20 may provide user with a way to directly contact the entity, such as sending a message or providing voice or video communication between user 14 and the entity. Even further, matching server 20 may be configured to allow user 14 to express a negative preference for the entity through dislike button 36. In one embodiment, when, for example, dislike button 36 is utilized by user 14, matching server 20 may remove the entity from result list 31; in another embodiment, the entity may be removed from pool 30 of users from which matches are identified.

As an example only, consider that user 14 has submitted a search request to matching server 20. Matching server 20 may search through pool 30, identify results, and communicate result list 31 to user 14 which would contain other users for whom matching server 20 had created a profile and who were identified through a search and selection process. Next, user 14 may be interested in learning more about Jane Doe, entity 31a; thus, user 14 would click view button 33 associated with Jane Doe. Matching server 20 would receive this request and respond by displaying Jane Doe's profile (stored in memory 26), as depicted in FIG. 1F. Next, after reading the profile, user 14 may be interested in contacting Jane Doe; hence, user 14 would click contact button 35. Matching server 20 would respond by allowing user 14 enter a message that matching server 20 would then communicate to Jane Doe.

Matching server 20 may even further be configured to allow user 14 to store a match result entity; in one embodiment, the system may be configured to allow user 14 to utilize favorite button 34 that will add the desired match result entity into another list. In another embodiment, utilizing favorite button 34 will remove the associated match result entity from result list 31.

As an example only, user 14 may decide that he would like to save Jane Doe's profile so that he can review it later. User 14 may click favorite button 34, and matching server 20 may respond by placing Jane Doe's profile into a separate list. Further, matching server 20 may also remove Jane Doe from user's 14 result list 31. As a result, user 14 may see another match result entity populate result list 31. This is beneficial because it may focus user 14 on evaluating new entities rather than reevaluating previously-known entities because the entities still appear in result list 31.

In some embodiments, matching server 20 may be configured to generate pool 30 by default according to various characteristics and preferences of user 14 and other users of the system. Matching server 20 may also restrict entities from being included in pool 30 based on the status of the profile, or if user 14 has rejected or blocked an entity. Matching server 20 may also restrict entities from the pool that have blocked or rejected user 14. For example, matching server 20 may not allow profiles that are not in good standing to be included in pool 30. In other embodiments, matching server 20 may be configured to generate pool 30 by first choosing seeds. Seeds include, but are not limited to, profiles that user has sent a message to or profiles that user 14 has expressed a preference for. Each seed is then compared to other entities to determine which entities will be included in pool 30. Any suitable method can be used to determine which entities are included in pool 30. For example, any characteristics or algorithms described herein may form the basis of such a determination. As another example, a commonality score may be generated based on the comparison between each entity and the seed. In some embodiments, this commonality score can be a measure of how physically similar the users are to each other. This score may be generated based on the number of users that have expressed a positive preference for both the seed and the entity being compared. This score may also be generated based on whether the seed and entity have been viewed together in one session; further, the more times the seed and entity have been viewed together, the larger the commonality score. The law of large numbers may allow for a vast amount of such commonalities to be established over a few days. Testing has revealed that using such commonality scoring methods has yielded at least one physical match for 80% of users whose profile has been viewed at least once, and between and 1000 physical matches for 60% of users whose profile has been viewed at least once. Matching server 20 may be further configured to allow entities that have a commonality score above a certain threshold to become a part of pool 30. Matching server 20 may further be configured to update pool 30. In some embodiments, matching server 20 may do so by creating new seed entities based on activity by user 14, such as indicating a preference for that entity. Further, matching server 20 may then compare the chosen seed entity with other profiles stored in matching server 20 and determine whether those profiles will be included in pool 30 using a threshold score as described above. At least one advantage realized by this embodiment is that user 14 is presented with updated potential matches which increases the likelihood of user 14 finding a suitable match. Another advantage present in certain embodiments is that these updated potential matches have a greater likelihood of compatibility with user 14 since they are chosen based on their commonality with entities user 14 has expressed a preference for.

As an example only, consider the case in which user 14 has registered, requested a search, and received from matching server 20 results list 31. Then, user 14 decides to contact Jane Doe and presses contact button 35. Aside from providing user 14 with the ability to contact Jane Doe, matching server 20 will designate Jane Doe's profile as a seed. Matching server 20 will then compare Jane Doe's profile to other profiles stored in memory 26 in order to identify other users who may be similar to Jane Doe and thus be a good match for user 14. In this example, matching server 20 will generate a commonality score for each of these comparisons and compare these scores to a preset threshold. If the commonality score is lower than the threshold, that profile will not be added to pool 30. However, if the commonality score is higher than the threshold, matching server 20 will add this profile to pool 30. As an example, further assume that the seed, Jane Doe, is being compared to another entity, Susan Smith. Based on the fact that both Susan and Jane have three users (Tom, Dick, and Harry) who have expressed a positive preference for their profiles, matching server 20 generates a commonality score of 100 for the comparison. In contrast, matching server 20 generated a commonality score of 50 for the comparison between the seed (Jane Doe) and yet another entity, Lucy Goosey. This was because only one user (Bob) had indicated a positive preference toward both Lucy and Jane. Continuing the example, matching server 20 is using a commonality threshold score of 70, which results in including Susan's profile (whose commonality score was greater than the threshold score) in pool 30 and excluding Lucy's (whose commonality score was less than the threshold score). Thus, user 14 gets the benefit of having more entities identified that may be good matches.

In some embodiments, matching server 20 may be configured to include behavioral scales. These may include multi-item scales for materialism and gender-role traditionalism. Such scales may provide the advantage of improved matching through deeper appreciation for the personality of entities in the system.

In some embodiments, matching server 20 may be configured to analyze profile text for categories. It may search for a number of text strings and then associate the profile with any number of categories. As an example only, matching server 20 may add any profile to the Cat category whose text contains any of the following strings:

"cat" "cats" "cat." "cats." "cat," "cats,"

Matching server 20 may be configured to make it more likely that a profile will be in a result list if categories associated with the profile are also categories found in the user's profile who submitted the search request.

Matching server 20 may be configured to analyze one or more portions of the text of an entity's profile and generate a readability score that may be used in various ways, such as in the process of searching for matches for user 14. In some embodiments, matching server 20 may analyze factors such as, but not limited to: average number of words per sentence, total number of words with greater than three syllables, and total number of words in the profile. Matching server 20 may also concatenate all of the collected responses with a single space between them. It may further break the text into sentences, words, and syllables. From these statistics, matching server 20 may also be configured to generate a readability score by, in one embodiment, taking the average of the Flesch Kincaid Reading Ease test, the Flesch Kincaid Grade Level test, and the Gunning Fox score. Other embodiments may utilize any other combination of these or other tests to determine a readability score. In some embodiments, analyses may be used to determine the IQ of an entity, the grade level of the writing, or how nervous the entity generally is. An advantage of this embodiment may be that the system provides user 14 with a metric for determining approximate intelligence of other users. The readability score may be used, for example, in the matching process to identify potential matches.

As an example only, the Flesch Kincaid Reading Ease score may be generated by first computing the following intermediate score:

$$206.835 - (1.015 * [\text{Average Words per Sentence}]) - (84.6 * [\text{Average Syllables per Word}])$$

Then, the Flesch Kincaid Reading Ease score is determined by using the following table:

| Intermediate Score Condition | Flesh Kincaid Reading Ease Score |
|---|---|
| <100 | 4 |
| <91 | 5 |
| <81 | 6 |
| <71 | 7 |
| <66 | 8 |
| <61 | 9 |

| Intermediate Score Condition | Flesh Kincaid Reading Ease Score |
|---|---|
| <51 | 10 |
| <31 | 13 |
| <0 | 14 |
| Else | 15 |

The Flesch Kincaid Grade Level may be computed according to the following:

(0.39*[Average Words Per Sentence])+(11.8*[Average Syllables Per Word])−15.59

The Gunning Fox score may be computed according to the following:

([Average Words Per Sentence]+(([Number Of Words With More Than 3 Syllables]/[Number of Words In Entire Text])+100))*0.4

As indicated, any suitable tests may be utilized in any suitable manner to determine a readability score.

In some embodiments, matching server 20 may be configured to allow a user to interact with the result list of another user. Matching server 20 may be configured to allow a user to express a preference for entities within a result list of another user, and to indicate to the other user of this preference. Thus, a user may be able to get advice from a friend regarding what other users may constitute good matches for the user and thus be able to find a better match.

As an example only, consider FIG. 1A and FIG. 2. Two users 14, Harry and Sally, are connected to matching server 20 via terminals 10. Display 12a is used by Harry while display 12b is used by Sally. Matching server 20 allows Sally to view Harry's result list 31 on her terminal in display 12b. By pressing recommend button 37, Sally may indicate a preference for one or more of the entities in result list 31. Assume Sally presses recommend button 37 associated with Jane Loe. After doing so, matching server 20 will notify Harry of Sally's preference. On Harry's display 12a, matching server 20 will cause notification 39 to appear, associating it with Jane Loe. Notification 39 will indicate to Harry that Sally has recommended Jane Loe as a potential match. Harry may find Sally's preference helpful in determining which entities he should pursue further if, for example, he believes Sally understands the type of person he is looking for.

In one embodiment, matching server 20 may be configured to analyze the profiles of both user 14 and the entities in pool 30 for keywords. Matching server 20 may be configured to search through the profile of user 14 for keywords that relate to things such as activities and interests. Matching server 20 may generate a score for each entity in pool 30 based on a comparison between the list of keywords found in user's 14 profile and a similarly-generated list of keywords of each entity in pool 30. In one embodiment, this is accomplished by storing a list of words in memory 26, and using it to identify keywords in the searched profiles. In some embodiments, identified keywords may be used as a means of weighting various scores. As an example only, a profile that contains the word "God" may be weighted much differently than a profile which has merely indicated that their religious preference is Christian. In various embodiments, this may provide an advantage to user 14 in that user 14 is able to determine how similar he/she is with a potential match. In addition, the keyword analysis may be used by the system when searching and identifying matches for a user.

As an example only, consider two registered users, Harry and Sally, both of whom have profiles stored in matching server 20. Matching server 20 then analyzes each of these profiles by comparing it to a list of predefined keywords. Matching server 20 then associates each word that matched the list of keywords with each profile. Now assume that Harry performs a search. While fulfilling Harry's query, matching server 20 evaluates Sally's profile for inclusion in Harry's result list 31. This evaluation includes comparing the list of keywords found in Harry's profile to the keywords found in Sally's profile. The more keywords that Harry and Sally have in common, the more likely it will be that matching server 20 will include Sally's profile in Harry's result list 31.

In some embodiments, matching server 20 may be configured to impute a level of physical attractiveness to an entity in pool 30. Matching server 20 may be configured to monitor how frequent an entity in pool 30 has been viewed as well as how many times that entity has been part of a result list in order to impute the level of physical attractiveness. Matching server 20 may further be configured to generate a score based on this data. Further, in some embodiments, matching server 20 may impute physical attractiveness to an entity based on the imputed physical attractiveness scores of other entities. Matching server 20 may compute an average of the imputed physical attractiveness scores of the other entities weighted by the commonality score between each of the other entities and the present entity. Empirical data indicates that people are more likely to match with people of similar attractiveness. Thus, in many embodiments, a user may obtain an advantage in that they are able to be presented with potential matches that, according to one measurement, are as attractive as the user.

As an example only, consider a registered user, Sally, whose profile was created by matching server 20 in January. Since that time, matching server 20 has recorded the number of times Sally's profile has appeared in any user's result list 31; assume that this has occurred 10 times. Further, matching server 20 has also recorded the number of times a user has viewed Sally's profile by clicking view button 33 associated with Sally's profile; assume that this has happened 5 times. In this manner, matching server 20 has constructed a ratio that represents the imputed physical attractiveness of Sally's profile. Still further, assume that Harry, a registered user, now submits a query. Matching server 20 has evaluated the imputed physical attractiveness ratio of Harry's profile. When evaluating Sally's profile for inclusion in result list 31 returned to Harry, matching server 20 will compare the imputed physical attractiveness of Sally's profile and Harry's profile. The more similar the ratios associated with Harry and Sally's profiles are to each other, the more likely it is that Sally's profile will be selected by matching server 20 to be in Harry's result list 31. In another example, assume that Sally's profile has not been registered long enough to generate a meaningful imputed physical attractiveness ratio. Matching server 20 may then generate an imputed physical attractiveness score based on entities that Sally does have commonality scores with. This computed average may be weighted by the strength of the commonality score between Sally and each entity with whom she has a commonality score. Continuing the example, assume that Sally has a commonality score of 5 with Lucy and 10 with Julia. When matching server 20 computes the Sally's average, it will give twice as much weight to Julia's imputed physical attractiveness score than to Lucy's.

In some embodiments, matching server 20 may be configured to make an entity in result list 31 more appealing to user 14 by pointing out coincidences in the profile data that give user 14 a sense of fate with the entity. In one embodiment, matching server 20 may be configured to search for similar initials, birthplaces, birth dates, birth month, birth year, university, first names, last names, user handles, parental occupations, and keywords to identify users who may give another user a sense of fate. In other embodiments, matching server 20 may use the fate characteristics as a metric in the matching process.

Figure 3:
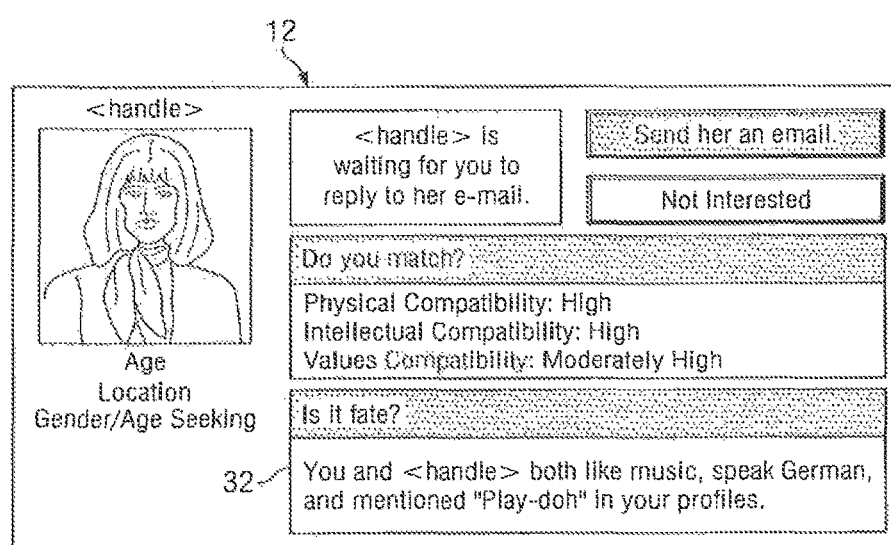
FIG. 3 is a diagram of the display from FIG. 1B depicting how the user may be made aware of fate characteristics the user shares with a match result entity, in accordance with a particular embodiment.

As an example only, assume that Harry is a registered user who has performed a search. After matching server 20 returns a result list, Harry chooses to learn more about one of the entities in the result list and clicks view button 33. Consider FIG. 3, which is only an example of information that matching server 20 may return to Harry after clicking view button 33. In Harry's display 12, matching server 20 presents certain details about the profile. In particular, matching server 20 presents to Harry a fate notification 32 which points out specific similarities between the profile of the entity and Harry's profile. Reading fate notification 32 gives Harry a sense of familiarity which enhances his appreciation for the profile.

In another example, fate characteristics may be used to decide whether a profile in pool 30 is included in user's 14 result list 31. Assume that Harry is a registered user who has submitted a matching query to matching server 20. While determining which entities to include in Harry's result list, matching server 20 considers two profiles: Sally and Roxy. Sally and Harry both have the same birth date, initials, and have parents that work in the same profession. In contrast, Roxy and Harry only share the same birth place. Matching server 20 may be configured to award more points to Sally than to Roxy based on these comparisons, making it more likely that Sally's profile will be included in Harry's result list.

In some embodiments, matching server 20 may be configured to evaluate the likelihood of contact between user 14 and an entity in pool 30. Matching server 20 may be configured to compare demographic data between user 14 and pool entity 30*a*. In another embodiment, matching server 20 may be configured to weigh the demographic similarities and differences based on the sex of user 14. The demographic data may include, but is not limited to, age, education, ethnicity, income, and location.

As an example only, assume that Harry and Sally are registered users who have profiles in matching server 20. Harry has submitted a search request to matching server 20. While fulfilling this request, matching server 20 evaluates Sally's profile since her profile is in pool 30. As part of the evaluation, matching server 20 looks at the differences between Harry and Sally's stated age, income, education, ethnicity, and location. In this example, Harry is 10 years older than Sally, makes $10,000 more per year, and has a Master's degree while Sally has a bachelor's degree. Even with these disparities, matching server 20 will give Sally's profile a high score which makes it more likely that Sally's profile will appear in Harry's result list. However, if it was Sally who submitted the search, and matching server 20 was evaluating Harry's profile, a different score is possible. So, if it were Sally who was 10 years older, made $10,000 more per year, and had a Master's degree while Harry had a Bachelor's degree, matching server 20 would give a low score to Harry's profile, making it less likely that his profile would appear in Sally's result list. Matching server 20 may be configured this way because empirical data has shown that these demographic differences do not have an equivalent effect on the choices men and women make regarding matches.

In another embodiment, matching server 20 may be configured to compare the locations of user 14 and pool entity 30*a* in increments of ten miles. In yet another embodiment, matching server 20 may be configured to score the location comparison in light of other factors; as an example, matching system 20 may be configured to return a score consistent with a 10 mile difference in location even though there is a 50 mile difference between user 14 and pool entity 30*a* if user 14 and pool entity 30*a* have the same income, education, and age. An advantage realized in several embodiments is that it better approximates how a user evaluates entities. Entities that live further away are generally less appealing to a user; but, users may still be interested if the entity matches their preferences in other categories.

As an example only, consider a registered user, Harry, who submits a search request. While fulfilling this request, matching server 20 examines Sally's profile in pool 30, and determines that the stated locations of Harry's and Sally's profiles are 13 miles apart. Matching server 20 will give Sally's profile a score as if the distance between them were only 10 miles. However, in yet another example, Sally's profile may indicate that she lives 50 miles away from Harry. Yet, matching server 20 also notes that both Harry and Sally make $100,000 per year, have Master's degrees, and that Harry and Sally are one year apart in age (Harry is older). Given these similarities, matching server 20 will give a score to Sally's profile that is consistent with a 20 mile difference in location even though they are actually 50 miles apart. In this manner, matching server 20 takes into account empirical data that shows that people searching for matches who indicate that they want to see matches who live close to them are still willing to pursue a potential match that lives far away if the potential match fits very closely with the other search criteria.

In another embodiment, matching server 20 may be configured to evaluate the age difference between user 14 and pool entity 30*a* using ranges as well as a sliding scale. By way of example only, matching server 20 may be configured to assign a high value to an age difference between 0 and −5, while assigning a lower value to an age difference between +2 and 0. An even lower value may be assigned to an age difference between −6 and −8. Even lower values would be assigned incrementally as the age difference increases outside of the ranges discussed. The higher the assigned value is, the more likely it will be that pool entity 30*a* will be included in result list 31. Yet another embodiment may apply this combination of ranges and a sliding scale but use different values and ranges depending on the sex of user 14.

As an example only, consider a situation in which a registered user, Harry, requests a search to be performed. While fulfilling this request, matching server 20 evaluates Sally's profile, which was in pool 30. As part of the evaluation, matching server 20 compares the ages of Harry and Sally, and determines that Harry is two years older than Sally; this determination leads to matching server 20 assigning, in this example, points to Sally's profile. Matching server 20 may also be configured to assign 50 points to Sally's profile had she been five years younger than Harry; but, if she had been up to two years older than Harry, matching server 20 may have been configured to assign 40 points to her profile. Matching server 20 may be further configured to assign 30 points to Sally's profile if she was 6 to 8 years younger than Harry. However, if Sally were more than 8 years younger than Harry, matching server 20 may be configured to further decrease the number of points assigned to her profile: if she was 9 years younger, then 25 points; if she was 10 years younger, 20 points; if she was 11 years younger, 15 points; etc. The more points assigned to Sally's profile, the more likely it is that her profile will appear in Harry's result list. Thus, matching server 20 may be configured to assign a score based on age difference using a combination of ranges and a sliding scale.

In another example, matching server 20 may assign scores differently if it was Sally who was searching and if it was Harry's profile that was being evaluated. In this example, matching server 20 may be configured to assign Harry's profile 50 points if he were between 1 and 5 years older than her. If he were 6 to 8 years older than her, matching server 20 may assign 45 points. If he were greater than 8 years older than her, matching server 20 may assign points in the following fashion: if he was 9 years older, 40 points would be assigned; if he was 10 years older, 35 points would be assigned; etc. However, if he was up to two years younger than Sally, matching server 20 may assign 50 points to his profile. If he were more than two years younger, matching server 20 may assign less points on a sliding scale: 45 points if he were 3 years younger, 40 points if he were 4 years younger, etc. The more points assigned to Harry's profile, the more like it is that his profile will appear in Sally's result list. This example illustrates how matching server 20 may be configured to take the sex of user 14 into account when scoring based on age differences.

In various embodiments, matching server 20 may be configured to evaluate the attractiveness of an entity in pool 30 through collected feedback from other users. In one embodiment, matching server 20 may present an entity to user 14, prompting user 14 to rate the attractiveness of the entity on a scale from 1-9. This range gives the advantage of having a midpoint. Matching server 20 may further be configured to collect such responses and store them; in one embodiment, matching server 20 may store the data in memory 26, using a structure such as database 26*b*. Matching server 20 may further be configured to compute the average of such responses for the entity, and store this number as well. In various embodiments, these values may be used in order to help in the matching process. Empirical data indicates that people are more likely to match with people of similar attractiveness. Thus, in various embodiments, users whose attractiveness rating are similar will be more likely to appear in each other's result list. Further, a user may indicate that they only want profiles in their result list whose average attractiveness rating is higher than an indicated threshold.

As an example only, assume registered user, Harry, uses terminal 10, which in this example is Harry's personal computer, and establishes communication with matching server 20. In this example, this communication occurs by Harry using a Web browser to access a Web page controlled by matching server 20. Sometime after visiting the Web page, matching server 20 may present Harry with an option to rate the physical attractiveness of other users registered with matching server 20. Using display 12 and interface 16, Harry may view profiles of registered users and rank them on a scale of 1-9 by entering the values using interface 16; in this example, interface 16 comprises a mouse and/or a keyboard. After submitting this rating, matching server 20 will associate it with the profile and store it. Matching server 20 will also allow other users to rate profiles, thereby collecting a plurality of rankings for profiles. Matching server 20 may use this data when trying to find matches for users. One example of this is that matching server 20 may allow user 14 to specify that he/she is searching for profiles which have an average rating of 6 or above. In turn, matching server 20 may populate user's 14 result list from the pool only with profiles whose average rating is at 6 or above. Another example of how matching server 20 may use this data involves making it more likely that an entity will appear in a user's result list if the entity and that user have a similar average attractiveness rating. So, if a user has an average rating of 6, then an entity with an average rating of 5 may be more likely to appear in the user's result list than an entity with an average rating of 2.

In another example, assume that Harry is a registered user and has requested a search. While fulfilling this request, matching server 20 evaluates Sally's profile. As part of this evaluation, matching server 20 notices that Sally's profile contains feedback from other users ranking the attractiveness of Sally's profile. Matching server 20, in this example, averages that data; Sally's profile average is 6. Matching server 20 may then examine Harry's profile to determine a similar average. If Harry's profile has an average close to 6, it will be more likely that matching server 20 will include Sally's profile in Harry's result list. If Harry's profile average is lower than 6, it will be less likely that Sally's profile will be included in Harry's result list. If Harry's profile average is greater than 6, it will be even less likely that Sally's profile will be included in Harry's result list. The more Harry's profile average deviates from that of Sally's, the less likely it will be that matching server 20 will present Sally's profile in Harry's result list.

In some embodiments, matching server 20 may be configured to analyze profile information and received activity information to construct "pairs" which link at least two profiles. These pairings may also be associated with a value that ascertains the quality of the pairing. For example, a pairing which results from one user viewing the profile of another user may be assigned a value that is less than a pairing which results from a first user viewing the profile of a second user when the second user has also viewed the first user's profile. Matching server 20 may use these pairings in order to generate search results for entities within and outside of the pairing. Each member of the pair may be used as a seed entity for generating search results for users in matching server 20. In various embodiments, an advantage may be realized as matching server 20 analyzes many of these pairs to develop dynamic results to users of the system, the results being potentially more relevant as matching server 20 leverages the interaction between users and profiles to generate search results.

Pairs may be formed from a variety of user activity received by matching server 20. This activity may include: profile views, mutual profile views, one-way double blind communication, mutual double-blind communication, declining double blind communication, one way wink, mutual wink, expressing disinterest in response to receiving a wink, one way favorite, and mutual favorite. Other suitable activity may also be received by matching server 20 and utilized as a basis for generating pairs.

For example, Harry may be a registered user who has expressed a positive preference for Sally. Matching server 20 may be configured to generate a pair which includes Harry and Sally. Matching server 20 may utilize this pair when providing search results to other users. Betty may have requested matches, and Betty may be similar to Sally. Matching server 20 may present Harry in Betty's result list as a result of the pairing between Harry and Sally. Further, Jim may have executed a search and Jim may be similar to Harry. As a result of the pairing between Sally and Harry, matching server 20 may present Sally in Jim's list of search results.

In some embodiments, matching server 20 may be configured to encourage user 14 to interact with entities in pool 30. For example, matching server 20 may present a list of limited entities from pool 30 to user 14, but not present other entities to user 14 unless user 14 interacts with the already presented entities. Possible interaction with these entities may include viewing more information regarding the entity, expressing a positive or negative preference for the entity, and choosing to contact the entity. Other suitable forms of interaction may also be utilized. For example, matching server 20 may prompt the user with a question about the list of entities, such as asking whether or not the user likes the entity. Responses to such prompts may include "yes," "maybe," "no," "remove," and "remove other." The presented entities may be chosen using a variety of methods. For example, the presented entities may be chosen based on various scoring algorithms as described above. In addition, presented entities may be chosen using predictive analysis, such as logistical regression. Other techniques may be used to determine the presented entities. For example, entities that have been presented previously may be excluded. As another example, entities that have been blocked by user 14 may also be excluded. In various embodiments, a combination of these techniques as well as others may be used to determine the limited number of entities presented to user 14.

For example, Harry may be a registered user of the matching system. Matching server 20 may be configured to present to Harry a list of five entities that Harry must interact with. Once Harry has interacted with these entities, matching server 20 may present five more entities for Harry to interact with. Previously, Harry has blocked Sally, another registered user of the system. As a result, matching server 20 may exclude Sally from being presented to Harry in the list of five entities. Further, Harry has already interacted with Betty, another registered user of the system: Harry sent a message to Betty utilizing matching server 20. As a result, Betty will be excluded from being presented to Harry in the list of five entities. Matching server 20 may then choose two of the five entities using scoring algorithms described above. For example, matching server 20 may choose Alice and Amy to be presented in the list of five entities because Alice and Amy have received high scores when their profiles were compared to Harry's profile. Matching server 20 may choose the remaining three entities using predictive analysis. According to this example, matching server 20 may use logistical regression to identify Carla, Christi, and Camela as the other three entities to present to Harry. Thus, in this example, Harry is presented with a list of five entities by matching server 20. Matching server 20 may not present another set of five entities until Harry has interacted with these five entities. Harry may interact with these entities in a variety of ways. For example, Harry may send a message to Alice and send a "wink" to Amy. In addition, Harry may choose to view more information about Carla's profile, but express a negative preference towards Christi and Camela. After matching server 20 receives these types of interaction with the presented five entities, another set of five entities may be presented to Harry.

In this example, matching server 20 may further be configured to process the user interaction provided by Harry. For example, matching server 20 may utilize Alice's profile as a seed entity to generate other possible entities to present to Harry since Harry sent a message to Alice. Thus, a benefit is from presenting the five entities to Harry in that the interaction between Harry and these entities may be utilized by matching server 20 to generate other entities for matching to Harry. This serves as an example of how preferences may be identified based on user behavior.

Figure 4:
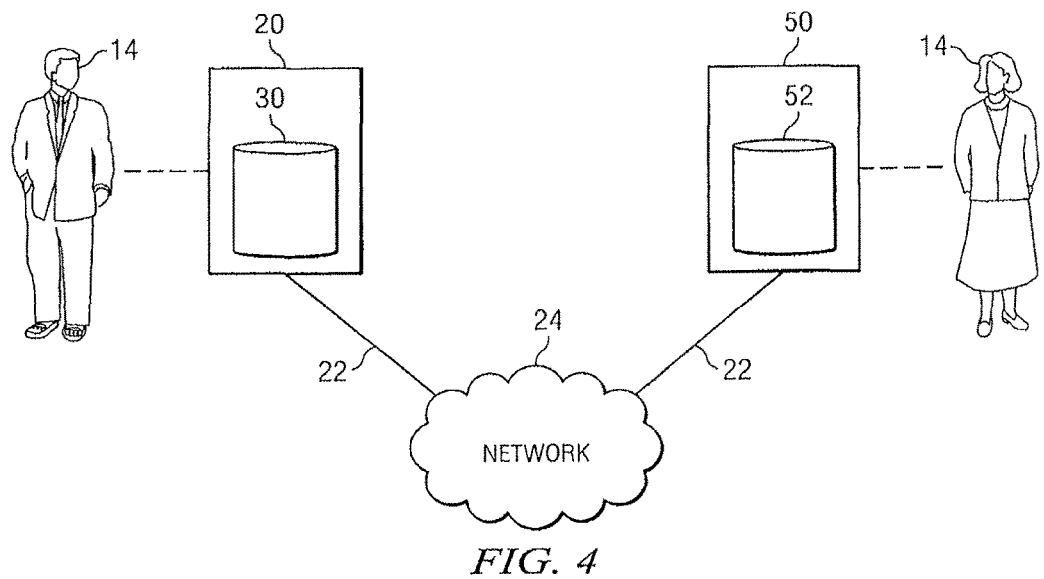
FIG. 4 is a diagram depicting how two platforms may be searched for a match, in accordance with a particular embodiment.

In FIG. 4, one embodiment is disclosed wherein matching server 20, with pool 30, may be configured to interact with another platform, such as social networking platform 50, containing a set 52 of users. Users 14 are communicatively coupled to matching server 20 and social networking platform 50. Matching server 20 may further be configured to provide users of social networking platform 50 a service by which they may search for users within set 52 or within pool 30 using the algorithms and processing of matching server 20. Matching server 20 may even further be configured to allow users of matching server 20 to search through pool 30 and set 52. Matching server 20 may be configured to parse the profiles of the entities in set 52, collecting data and applying algorithms.

In another embodiment, matching server 20 may be configured to allow users of social networking platform to interact with matching server 20 using social networking platform 50. This level of integration provides the advantage of users not having to learn and sign up for a different platform.

Social networking platform 50, in one embodiment, may be a service which stores profiles of its users. This service may be further configured to provide access to the stored profiles. In one embodiment, social networking platform 50 may also allow other services to interact with users of social networking platform 50 through social networking platform 50.

In one embodiment, matching server 20 may be configured to collect requests from users of social networking platform 50 and perform a search through pool and set 52. Matching server 20 may further be configured to present the results of this search from within social networking platform 50. Matching server 20 may further be configured to present entities in the search result from pool 30 as if they were entities of set 52; in one embodiment, matching server 20 may be configured to generate profiles of entities from pool 30 into set 52. Thus, users of social networking platform 50 may view all of the entities in the search result, regardless of their source (either from pool 30 or set 52), within the environment of social networking platform 50.

As an example only, consider two users: Harry, for whom matching server 20 has created a profile, and Sally, who has a profile stored in social networking platform 50. From within social networking platform 50, matching server 20 presents to Sally the ability to perform a search which Sally uses. The results of this search are presented to Sally within social networking platform 50. In this example, Harry's profile is displayed to Sally as a search result along with other entities from set 52 though Harry's profile was from pool 30. In this example, matching server 20 uses the algorithms discussed herein and searches through the profiles stored in pool 30 and set 52. In order to display Harry's profile to Sally, matching server 20 creates a profile in set 52 using the data stored in Harry's profile in pool 30. Sally is then able to interact with this newly created profile from within social networking platform 50 in the same manner as she is other entities in set 52.

In another embodiment, matching server 20 may be configured to allow its users to interact with social networking platform 50 through matching server 20. In one embodiment, matching server 20 supplements pool 30 with set 52. In yet another embodiment, entities from set 52 appear as entities of pool 30 to the user in their list of search results. In one embodiment, matching server 20 may be configured to generate profiles within pool 30 from entities of set 52; the system may be configured to do so through capabilities provided by social networking platform 50, such as an application programming interface.

As an example only, consider two users: Harry, whose profile is stored in matching server 20, and Sally, whose profile is stored in social networking platform 50. Harry submits a search request to matching server 20. Matching server 20 may return result list 31 to Harry, which, in this example, contains an entity representing Sally's profile. Matching server 20 may accomplish this by creating profiles in pool 30 that correspond to the profiles found in set 52. Once these profiles have been imported into pool 30, matching server 20 may then search through pool 30. While doing so, matching server 20 applies the algorithms and scores discussed herein. Thus, in this example, matching server 20 has been configured to both search and apply scoring algorithms to entities in pool 30 and set 52. Further, in one example, Harry is not able to distinguish that Sally's profile was originally stored in social networking platform 50. Rather, matching server 20 presents Sally's profile in the same manner as other profiles stored in pool 30. Thus, in this example, Harry may use favorite button 34, view button 33, and contact button 35 when interacting with Sally's profile in the same manner as described above.

One advantage present in various embodiments is that a user has a wider pool of entities to search through. Another advantage is that a user does not have to sign up with several platforms to search through the users on those platforms.

Figure 5:
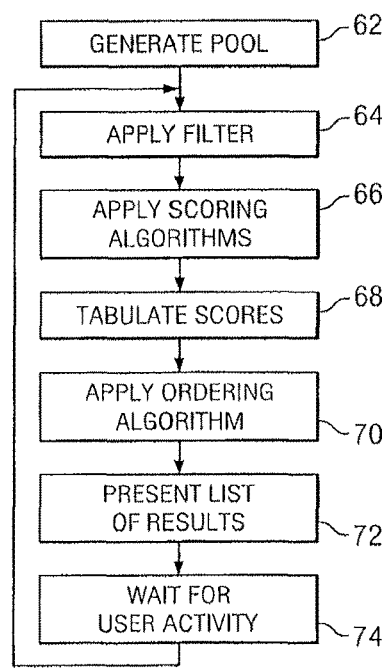
FIG. 5 is a flow chart indicating how a result list may be generated, in accordance with a particular embodiment.

FIG. 5 is a flowchart illustrating one embodiment of how result list 31 may be generated. At step 62, matching server 20 generates pool 30, as described above. At step 64, matching server 20 applies a filter to pool 30, removing certain entities; in various embodiments, this filter is based on user's 14 own sex and the sex user 14 desires to be matched with. At step 66, matching server 20 may be configured to apply algorithms to pool 30 that will generate a plurality of scores for each entity in pool 30. In one embodiment, these algorithms may include analyzing the text of the profiles of the entities in pool 30 to generate a readability score, determining how attractive an entity of pool 30 is, or measuring how likely it is that user 14 will contact an entity of pool 30. At step 68, matching server 20 may be configured to collect all of the scores from step 66; in one embodiment, matching server 20 may use database 26b to store all of these scores. At step 70, matching server 20 may be configured to apply an ordering algorithm which will determine the order in which entities in result list 31 are presented to user 14. In one embodiment, this ordering algorithm is based, in part, on the scoring algorithms applied at step 66. The ordering algorithm assigns points to each entity and orders them based on these values, constructing result list 31. An embodiment of this ordering algorithm is summarized in the following table:

| Condition | Number of Points for Ordering |
|---|---|
| Readability score 1 point higher than user | +33554432 |
| Match result entity has expressed a preference for the user | +16777216 |
| Match result entity has been recommended by a friend of the user | +8388608 |
| User has viewed the details of match result entity | +2097152 |

| Condition | Number of Points for Ordering |
|---|---|
| Match result entity has commonality with an entity user has expressed a preference for | +1048576 |
| Both have the same ambition | +128 |
| Both have the same beliefs | +16384 |
| Same answer for Build | +64 |
| Same answer for Car | +1 |
| Both have the same diet | +4 |
| Both have the same preference for drinking alcohol | +131072 |
| Same answer for Ethnicity | +1024 |
| Same answer for Fear | +256 |
| Same answer for Hair | +2 |
| Same answer for Number of children | +524288 |
| Same answer for morning | +32 |
| Same answer for "must have" | +32768 |
| Same answer for "night out" | +16 |
| Same answer for "pets" | +65536 |
| Same answer for politics | +8192 |
| Same answer for relationship status | +0 |
| Same answer for "romance" | +512 |
| Same answer for smoking preferences | +262144 |
| Same answer for sports interests | +8 |
| Same answer for "system" | +4096 |

As an example only, consider a registered user, Harry, who desires to perform a search. Before processing the request, matching server 20 may ask Harry what sex he is and what sex does he desire to be matched with; in this example, Harry responds that he is a male seeking a female. After doing so, matching server 20 will generate pool 30 as described above. Next, matching server 20 will apply a filter to remove certain entities from pool 30. In this example, all males will be removed from pool 30 since Harry is seeking a female. Further, all females seeking females will be removed from pool 30 since Harry is a male. In other examples, other entities that are removed from pool 30 include entities that Harry has expressed a negative preference for before, or entities that have expressed a negative preference for Harry. After pool 30 has been filtered, matching server applies a variety of scoring algorithms to the entities remaining in pool 30. These algorithms may account for various comparisons such as those based on readability, likelihood to contact, fate, and keywords described above. Matching server 20 will then tabulate these scores, storing them, in this example, in database 26b. Matching server 20 will then determine what order these entities are presented to Harry by applying an ordering algorithm. Here, matching server 20 assigns one ordering score to each entity by examining the results of the scoring algorithms. After doing so, matching server will present result list 31 to Harry, where the order of the entities that appear in the result list is based on the ordering algorithm. In this example, it is possible for result list 31 to change. Consider another user, Sally, who appears in Harry's result list. If Harry decides to add her into a separate list by using favorite button 34, Sally will be removed from result list 31 (as described above). However, Sally will also become a seed entity from which entities may be added to pool 30 (as described above). Hence, matching server 20 will update the pool, apply the filters, apply the scoring algorithms, tabulate the results, apply the ordering algorithm, and update result list 31. As another example, an entity may update their profile which can change result list 31. For example, assume Sally's profile had an ordering algorithm score that placed her within the top 20 entities in result list 31. Sally then changes her profile which results in keywords that match Harry's profile being added to her profile. Matching server 20 will then update her scoring algorithms. In this example, the change in Sally's profile and resulting increase in keyword matches with Harry's profile significantly increased her score. This was then reflected in the ordering algorithm as it was also applied to the updated profile. Afterwards, Sally's profile is now placed within the top 5 entities in result list 31.

In some embodiments, matching server 20 may be configured to receive required characteristics from user 14 regarding a match. User 14 may be allowed to specify such restrictions based upon any number of characteristics, including those described herein. For example, matching server 20 may allow user 14 to specify that entities that indicate they have children should not be displayed. In another example, user 14 may specify that only entities between the ages of 20 and 30 should be present in result list 31. In some embodiments, matching server 20 may implement these restrictions in step 64 of FIG. 5. In other embodiments, however, matching server 20 may refuse to apply these restrictions to certain entities based on the characteristics of the entities. Any number of characteristics, including those described herein, may form the basis upon which matching server 20 decides not to apply the restrictions submitted by user 14. As an example only, matching server 20 may ignore the restrictions if the entity has a high enough attractiveness rating. In another example, though user 14 has requested that no profiles which are located more than 50 miles away should be present in result list 31, matching server 20 may include such profiles because those profiles have over 5 matching keywords, a high attractiveness rating, and have specified the same life goals as user 14. Thus, in some embodiments, matching server 20 may refuse to apply restrictions submitted by user 14 based on any combination of characteristics or algorithms.

An advantage present in many embodiments is that through taking into account various factors when scoring potential matches and using only very few strict filters, a large amount of result entities may be returned to the user. A further advantage is that the ordering algorithm will put the most relevant search results first, saving the user time.

FIGS. 6-9 depict embodiments of a user interface presented to users of the matching system discussed above with respect to FIGS. 1 and 4. According to some embodiments, users 14 interact with matching server 20 through interface 16 presented by terminal 10. In addition to the embodiments of interface 16 described above in relation to FIG. 1A, interface 16 may also comprise a touch screen interface operable to detect and receive touch input such as a tap or a swiping gesture. In some embodiments, matching server 20 may import profiles from other social networking systems. This level of integration provides the advantage of users only having to update their profile information in one place. For example, when user 14 updates his profile within social networking platform 50, matching server 20 is also able to access the updated profile information.

In some embodiments, matching server 20 may further be configured, as part of the user registration process, to link to a user's existing profile within social networking platform 50. Matching server 20 may be configured to parse the profiles of the users in set 52, e.g., collecting data and applying algorithms. For example, matching server 20 may use explicit signals from social networking platform 50 such as common friends, common interests, common network, location, gender, sexuality, or age to evaluate potential matches between users 14. Matching server 20 may also use implicit signals such as for whom a user 14 expresses approval and disapproval. Implicit signals may also include facial recognition algorithms to detect ethnicity, hair color, eye color, etc., of profiles that user 14 has expressed interest in.

In particular embodiments, matching server 20 may have users 14 to link their user profiles to an existing profile within social networking platform 50. Matching server 20 may be configured to generate and add profiles to user profile pool 30 from entities of set 52; the system may be configured to do so through capabilities provided by social networking platform 50, such as an application programming interface. One advantage of linking is that matching server 20 can use the authentication features provided by social networking platform 50. For example, creating a user profile on matching server 20 containing false information becomes harder when the information must come from another verifiable and peer monitored source such as social networking platform 50.

In some embodiments, matching server 20 may allow a user 14 to propose a match between two of his connections within social networking platform 50. For example, Harry may be friends with both Bob and Sally within social networking platform 50. Harry believes Bob and Sally are a good match and therefore instructs matching server 20 to create a match between the two users in user profile pool 30. Once matched, matching server 20 allows Harry and Sally to communicate with each other.

In some embodiments, matching server 20 may be configured to apply a relevance algorithm which determines the content and order in which matching server 20 displays potential matches to user 14. A relevance algorithm may be based on both explicit and implicit signals from user 14. Explicit signals include information entered by user 14 as part of its user profile, such as height, weight, age, location, income, and ethnicity. Explicit signals may also include information about the characteristics user 14 is seeking in a match, such as gender, hair color, eye color, or occupation. Explicit signals may also be entered by user 14 as part of a search request. For example, user 14 may request matching server 20 limit the pool of potential matches to those users within a fixed geographic region. Matching server 20 is operable to compare geographic positions associated with the plurality of user profiles in user profile pool 30 with a geographic position associated with user 14. Explicit signals may be imported from a social networking platform 50, such as the number of shared entities in a social graph of user 14. Implicit signals may be based on the behavior of user 14 either within system 100 or other social networking platforms 50. For example, if user 14 has expressed disapproval of a user profile in the past, matching server 20 may no longer present the disapproved of user profile to user 14 in future searches. In various embodiments, matching server 20 may be configured to evaluate the attractiveness of a user in user profile pool 30 through collected feedback from other users. For example, matching server 20 may rank a user profile that receives more likes as more relevant than a user profile that receives fewer likes. In particular embodiments, matching server 20 may assign a higher relevance to a user profile if the other user has previously expressed a preference for user 14. As an example, user Harry may have previously expressed a preference for user Sally. If Sally requests a set of user profiles from matching server 20, and Harry's user profile is included in the set, matching server 20 may assign Harry's user profile a higher relevance based on his expression of preference for Sally. This can result in Harry's profile being presented to Sally sooner than otherwise would have occurred. This may be advantageous in that it can increase the chances of a match without compromising a user's feelings of privacy when expressing preferences for potential matches. In some embodiments, matching server 20 may be configured to use the fate characteristics as a metric in the relevance algorithm.

In some embodiments, terminal 10 is operable to determine its own geographic location by a global positioning satellite navigational system. Terminal 10 may also determine its own geographic location using cellphone-based triangulation techniques, Wi-Fi based positioning system, Global Positioning Satellite (GPS) system, or network addresses assigned by a service provider.

Figure 6:
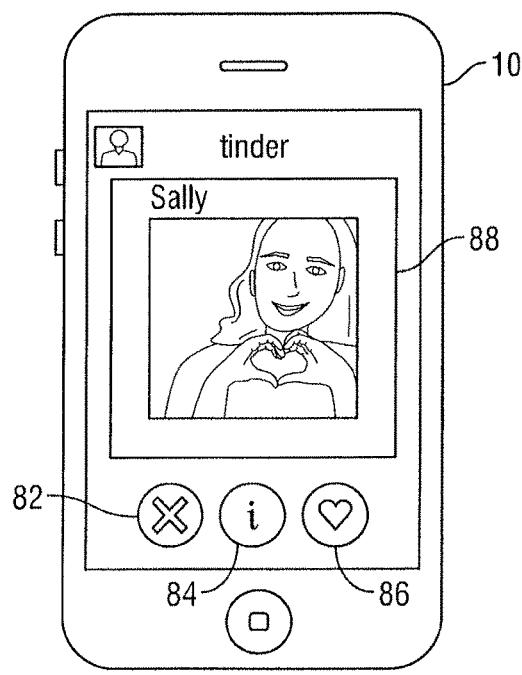
FIG. 6 shows one embodiment of the matching system displaying to a user the profile information of a second user.

FIG. 6 shows one embodiment of system 100 displaying to a user the profile information of a second user. Matching server 20 may be configured to search through its plurality of profiles and present suggested matches to user 14. In FIG. 6, one embodiment of this presentation is depicted as occurring through the display of terminal 10. In this embodiment, a plurality of user profiles is presented to user 14. Using terminal 10, user 14 may request that matching server 20 present a subset of users from user profile pool 30 based on specified search parameters. The display may show an image of a suggested user and one or more aspects of the suggested user's profile information. In some embodiments, the combination of image and one or more aspects of profile information is displayed as "card" 88 representing the suggested user. A set of suggested users may be displayed as stack of cards 88. User 14 may view information regarding one suggested user at a time or more than one of the suggested users at a time. User 14 may be presented with a summary of information regarding a suggested user. The summary may include one or more of: a picture, an icon, name, location information, gender, physical attributes, hobbies, or other profile information.

In some embodiments, terminal 10 may also display "information" button 84 which allows user 14 to request matching server 20 to retrieve and display more information about the presented user from user profile pool 30. In addition, user 14 may express approval or disapproval for a presented user. Expressing approval or disapproval can be accomplished through various methods. For example, terminal 10 may display "like" button 86 (represented by a green heart icon) and "dislike" button (represented by a red "X" icon). Pressing like button 86 indicates to matching server 20 that user 14 approves of and is interested in communication with the presented user. Pressing dislike button 82 indicates that user 14 disapproves of and does not want to communicate with the presented user. The approval preference of user 14 is anonymous in that matching server 20 does not inform users 14 whether other users have expressed approval or disapproval for them.

As an example, consider two registered users, Harry and Sally, both of whom have profiles stored in matching server 20. Harry is at a restaurant and requests matching server 20 to present him users within a one-mile radius of his location. Matching server 20 compares a geographic position associated with Sally with a geographic position associated with Harry. If Sally is currently within the one-mile radius of Harry and matching server 20 determines her profile information matches Harry's preferences, matching server 20 will present Harry one or more aspects of Sally's profile information. If other users also meet the search criteria, matching server 20 will present one or more aspects of those users' profile information as well. Harry may request more information about Sally by pressing information button 84. Harry may also indicate his preference to communicate directly with Sally by selecting like button 86. In another example, Harry may expand his search to a twenty-five mile radius to meet people in his town, not just his immediate vicinity.

Figure 7:
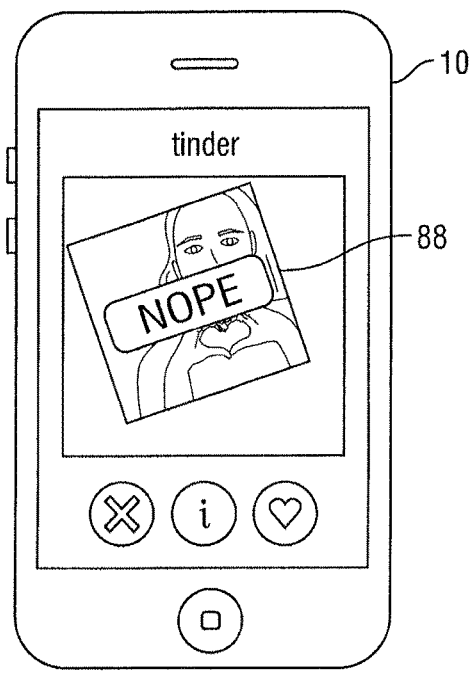
FIG. 7 is a diagram of the display from FIG. 6 showing the effect of a left swipe gesture.
Figure 8:
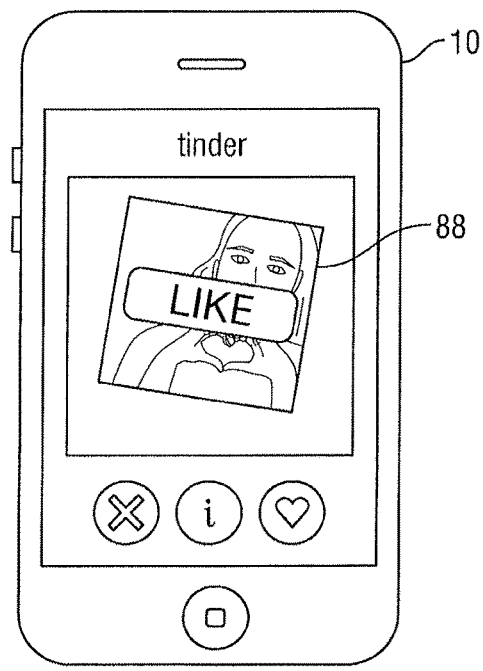
FIG. 8 is a diagram of the display from FIG. 6 showing the effect of a right swipe gesture.

FIGS. 7 and 8 are diagrams of embodiments of the display from FIG. 6 showing the effect of a left swipe gesture (FIG. 7) and the effect of a right swipe gesture (FIG. 8). In one embodiment, users 14 may navigate through the set of presented users by swiping through stack of cards 88. Users 14 may also express approval of a presented user by performing a right swipe gesture or express disapproval by performing a left swipe gesture. In some embodiments, user 14 performs a swiping gesture by moving a finger or other suitable object across a screen of terminal 10. Other suitable gestures or manners of interacting with terminal 10 may be used (e.g., tapping on portions of a screen of terminal 10).

In some embodiments, matching server 20 creates a match between two users 14 after both users 14 have expressed a preference for each other's profiles using like button 86 or the swiping gesture associated with like button 86. When matching server 20 creates a match, it may also provide the matched users with the ability to contact each other through a contact button. In some embodiments, when a match is created, matching server 20 may immediately (or soon thereafter) present an option to users 14 that have been matched to engage in a communication session (e.g., a chat, an SMS message, an e-mail, a telephone call, a voice communication session, a video communication session). This may be done in response to a first user 14 expressing a preference for a second user 14 that has already expressed a preference for the first user 14.

Figure 9:
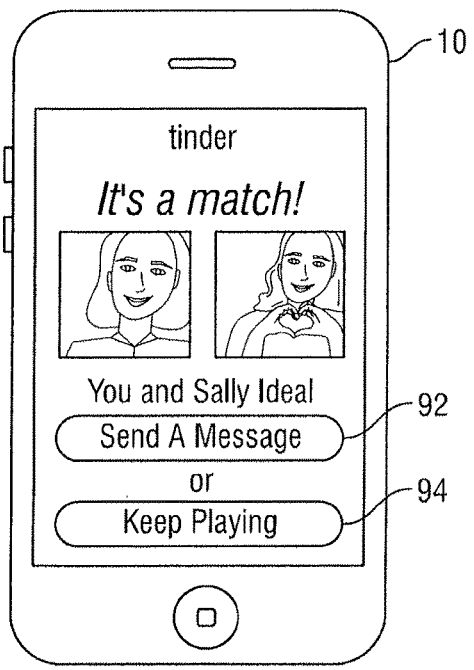
FIG. 9 shows the matching system displaying a match of a first user and a second user, in accordance with a particular embodiment.

FIG. 9 shows one embodiment of matching system 100 displaying a match of a first user and a second user, in accordance with a particular embodiment. Matching server 20 may provide first user 14 and second user 14 with each other's contact information such as a telephone number or an e-mail address. Matching server 20 may also provide both first and second users 14 with a way to directly contact the other, such as sending a message or providing voice or video communication between the first and second user. In some embodiments, direct communication may be initiated by pressing "Send a Message" button 92. Alternatively, a user may choose to continue browsing the set of presented users by pressing "Keep Playing" button 94.

For example, user Harry may indicate a preference to communicate directly with user Sally by selecting like button 86. At this point, Sally is not aware that Harry expressed a preference for her. If Sally also requests matching server 20 present her with a set of possible matches, Harry may appear in her set. Sally may select like button 86 (or perform an associated swiping gesture) when viewing Harry's profile. Matching server 20 may then notify both Harry and Sally that a match occurred. At this point, both Harry and Sally are made aware that they each expressed approval of each other's profile. Matching server 20 then enables Harry and Sally to directly communicate with each other (e.g., through a private chat interface).

In some embodiments, one advantage of a system disclosing preferences of profiles to users when mutual approval has occurred is that a user can feel more secure in their privacy knowing that their preferences will be disclosed to those that have expressed a preference for that user. As an example, a user can avoid embarrassment if their expression of preference for a profile was not reciprocated.

This may lead to users more actively expressing their preferences. Such increased activity can be used by the matching system to generate more potential matches or better rankings of potential matches. In some embodiments, matching server 20 may be configured to allow direct communication between users when there has been a mutual expression of preference. This may be advantageous because users can avoid browsing, deleting, or responding to unwanted messages.

Figure 10:
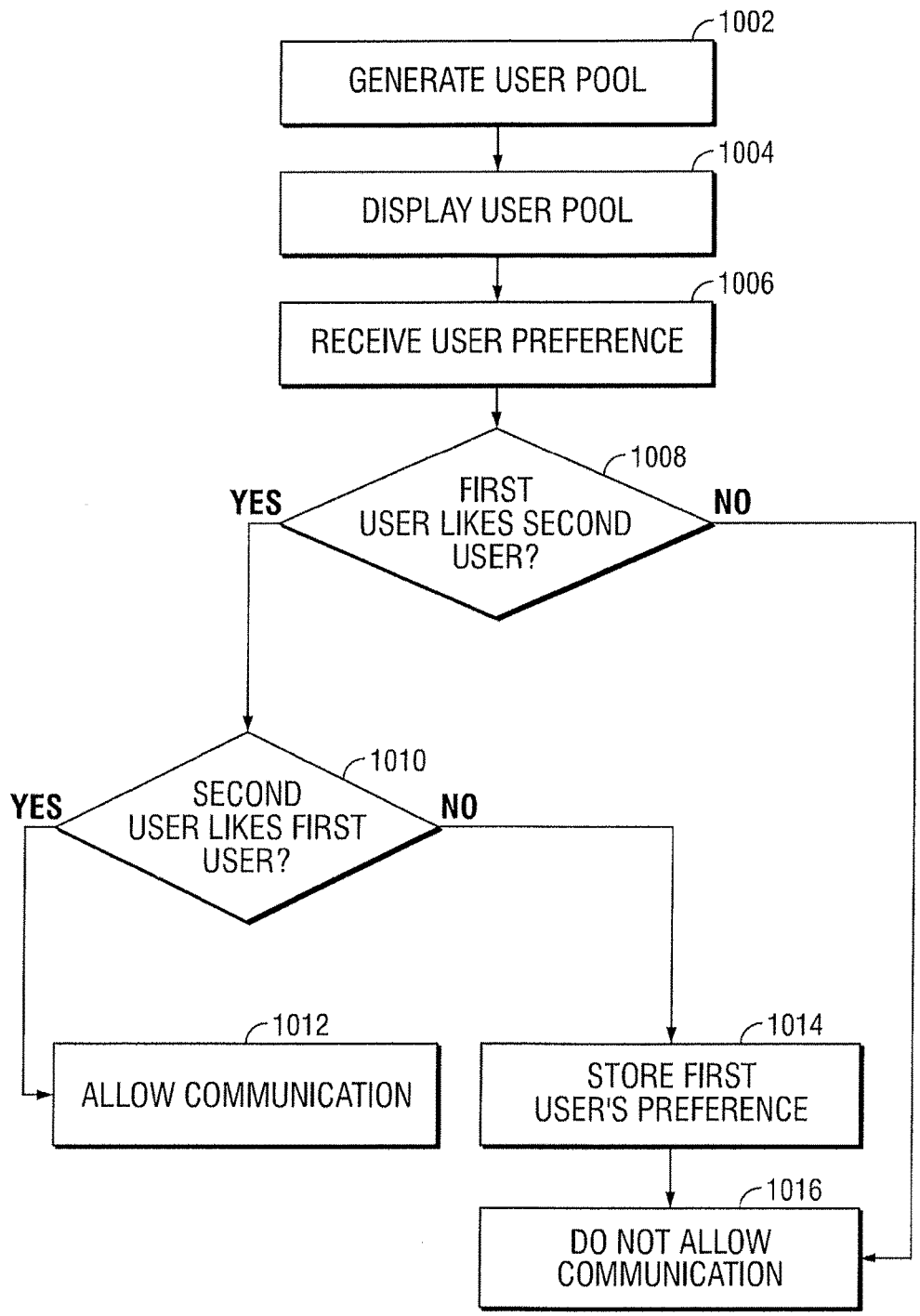
FIG. 10 is a flowchart depicting a method for enabling communication between two users of the matching system of FIG. 1 based on a mutual expression of approval, in accordance with a particular embodiment.

FIG. 10 is a flowchart depicting a method for enabling communication between two users of the matching system of FIG. 1 based on a mutual expression of approval, in accordance with a particular embodiment.

At step 1002, in some embodiments, matching server 20 generates a set of user profiles in response to a request for matching from a first user 14. At step 1004, matching server 20 presents the set of user profiles to first user 14. Matching server 20 determines the contents and ordering of the set of users profiles by using, e.g., the relevance algorithms described above in the discussion of FIG. 4. For example, matching server 20 may only include user profiles whose contents indicate location within a specified geographical radius and order the presentation of those user profiles based on the number of mutual friends in common with first user 14.

At step 1006, in some embodiments, matching server 20 receives an indication of the preference of first user 14 regarding a presented user profile. Matching server determines if first user 14 expresses approval or disapproval of the presented user profile at step 1008. If first user 14 disapproves of the presented user profile then a match is not made and, at step 1016, matching server 20 will not allow communication between the two users. If first user 14 expresses approval for the presented user profile at step 1008, then matching server 20 will check if second user 14 represented by the presented user profile has already expressed a preference for first user 14 at step 1010. If matching server 20 detects a mutual expression of approval then a match is made between first and second users 14. Then, at step 1012, matching server 20 allows private communications between first and second users 14. If a mutual expression of approval is not detected at step 1010, then matching server 20 stores the preference of first user 14 regarding the presented user profile for future comparison and continues to step 1016 where private communications are not yet allowed.

Figure 11:
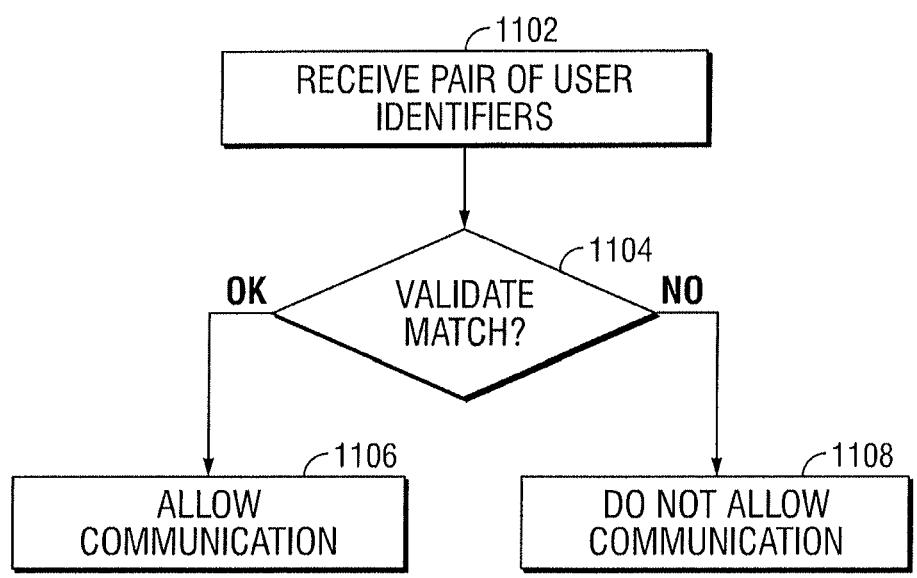
FIG. 11 is a flowchart depicting a method for enabling communication between two users of the matching system of FIG. 1 based on a user suggested matching proposal, in accordance with a particular embodiment.

FIG. 11 is a flowchart depicting a method for enabling communication between two users of the matching system of FIG. 1 based on a matching proposal suggested by a user, in accordance with a particular embodiment. At step 1102, matching server 20 receives interactions from first user 14. Interactions from first user 14 may include identification of user profiles for two other users 14. For example, Harry is connected to both Bob and Sally within social networking platform 50. Harry believes Bob and Sally are a good match for each other and generates a matching proposal requesting matching server 20 to create a match between Bob and Sally.

At step 1104, in some embodiments, matching server validates the suggested matching proposal between second and third users 14. For example, matching server 20 verifies that Bob's profile indicates that he wants to be matched with a woman, and Sally's profile indicates that she wants to be matched with a man. Matching server may also verify that Sally has not previously expressed disapproval for Bob. If matching server 20 determines the suggested matching proposal is valid, matching server 20 creates the match and allows communication between the users 14 suggested to be matched at step 1106. If matching server 20 determines the suggested matching proposal is not valid, matching server 20 does not create a match and does not allow communication between second and third users 14 at step 1108. In some embodiments, step 1104 may not be performed. For example, if a matching proposal is suggested, then matching server 20 may perform step 1106 with respect to the users suggested to be matched.

FIGS. 12A-D depict embodiments of a user interface. In some embodiments, the interface allows user 14 of terminal 10 to enable communication between other users 14 by suggesting a matching proposal to matching server 20.

Figure 12A:
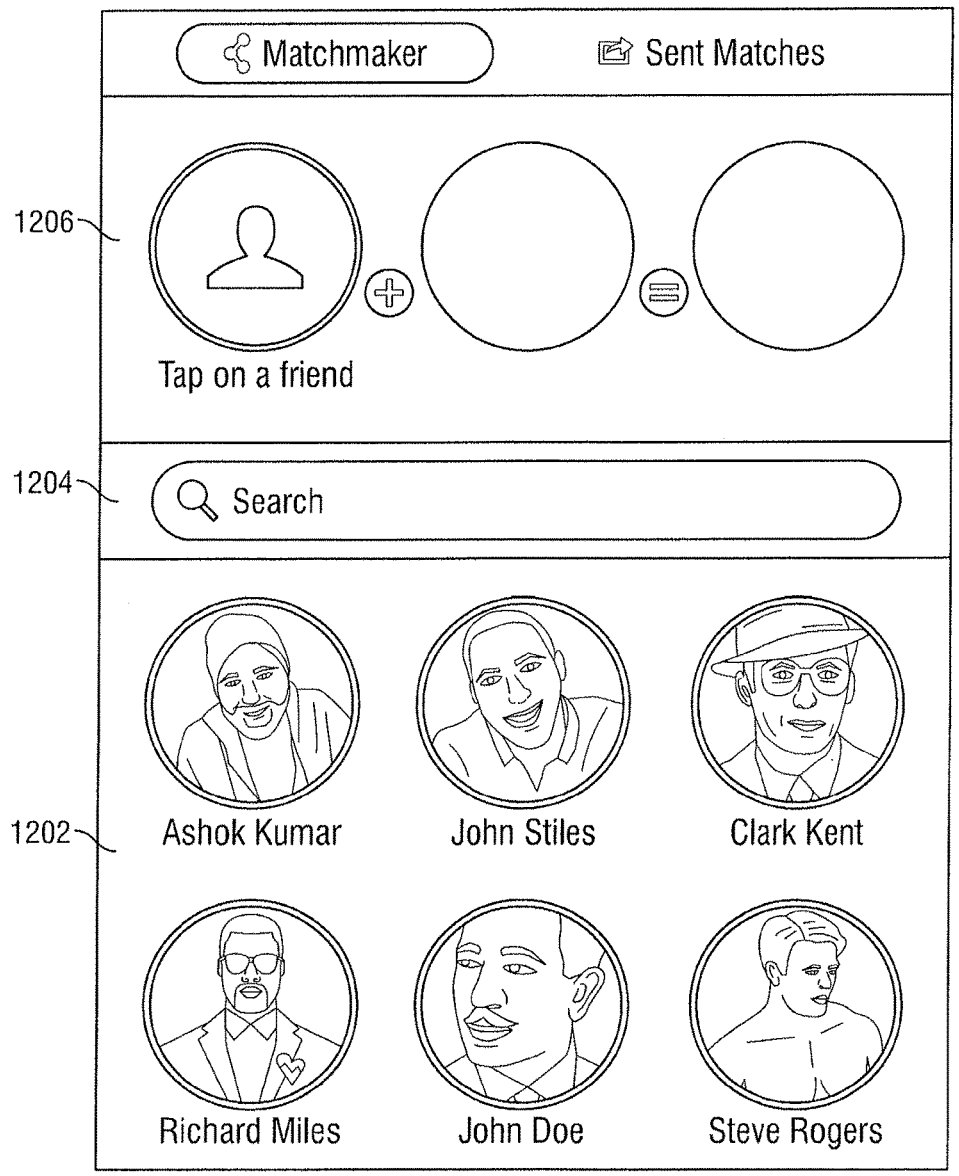
FIGS. 12A-D depict embodiments of a user interface.

FIG. 12A illustrates one embodiment of an interface for proposing a match between two users. The interface is divided into three sections: connection list area 1202, search area 1204, and suggestion area 1206. Connection list area 1202 displays a set of connections user 14 has with other users of, e.g., system 100 of FIG. 1. Connections may be based on prior matches created by matching server 20. Connections may also be imported from another social networking platform 50. Search area 1204 enables user 14 to search for particular connections within system 100. In some embodiments, the search may be limited to just the connections displayed in connection list area 1202. Suggestion area 1206 displays the connections that user 14 may use to form a suggested match.

Figure 12B:
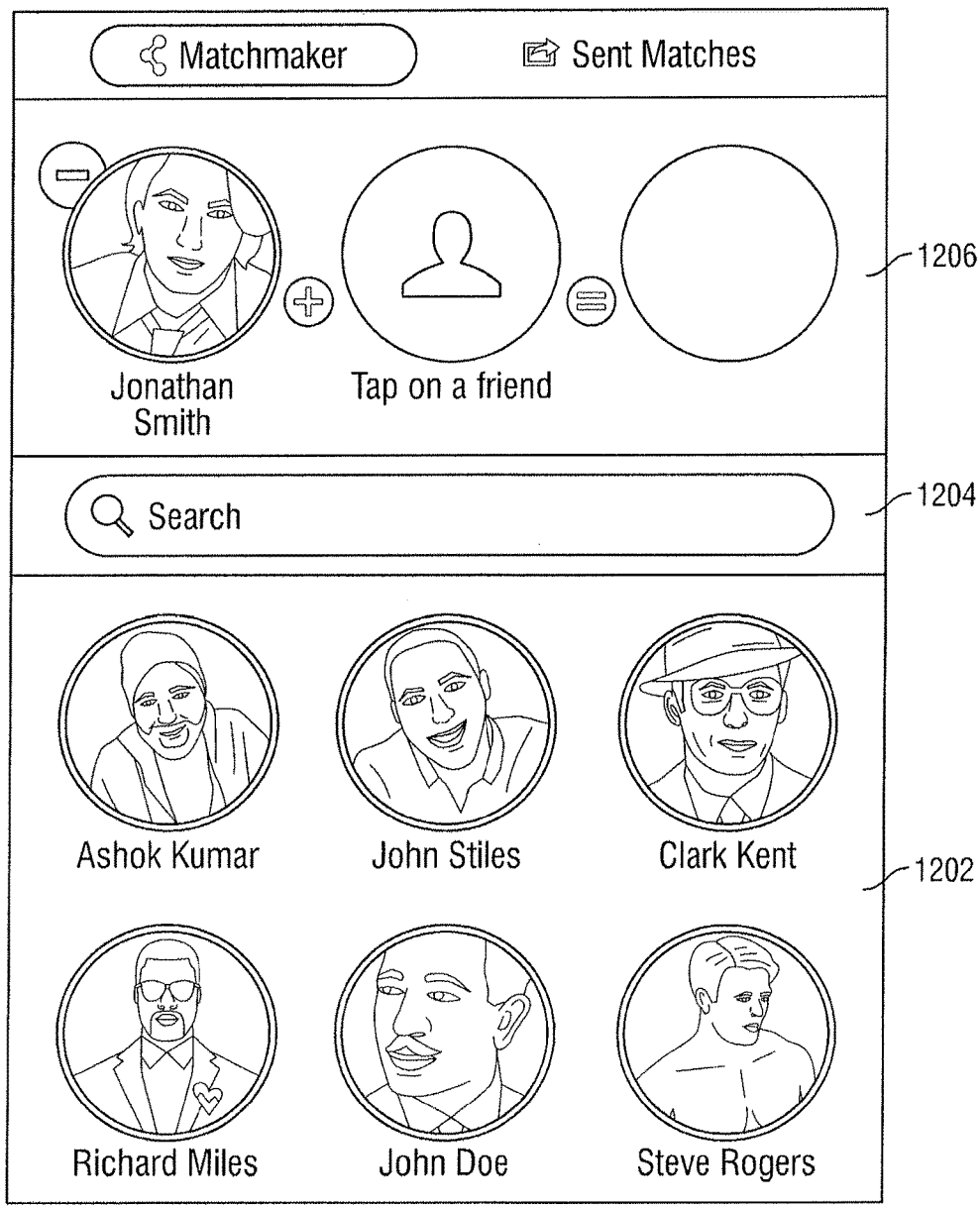

FIG. 12B illustrates suggestion area 1206 displaying a first selected user (i.e., "Jonathan Smith") of a proposed match between two users. User 14 identifies the first selected user through a set of interactions with connection list area 1202, search area 1204, and suggestion area 1206. For example, user 14 may locate a connection in connection list area 1202 by typing a user handle in search area 1204. User 14 may then add the connection to suggestion area 1206. In some embodiments, user 14 may drag the connection from connection list area 1202 to suggestion area 1206.

Figure 12C:
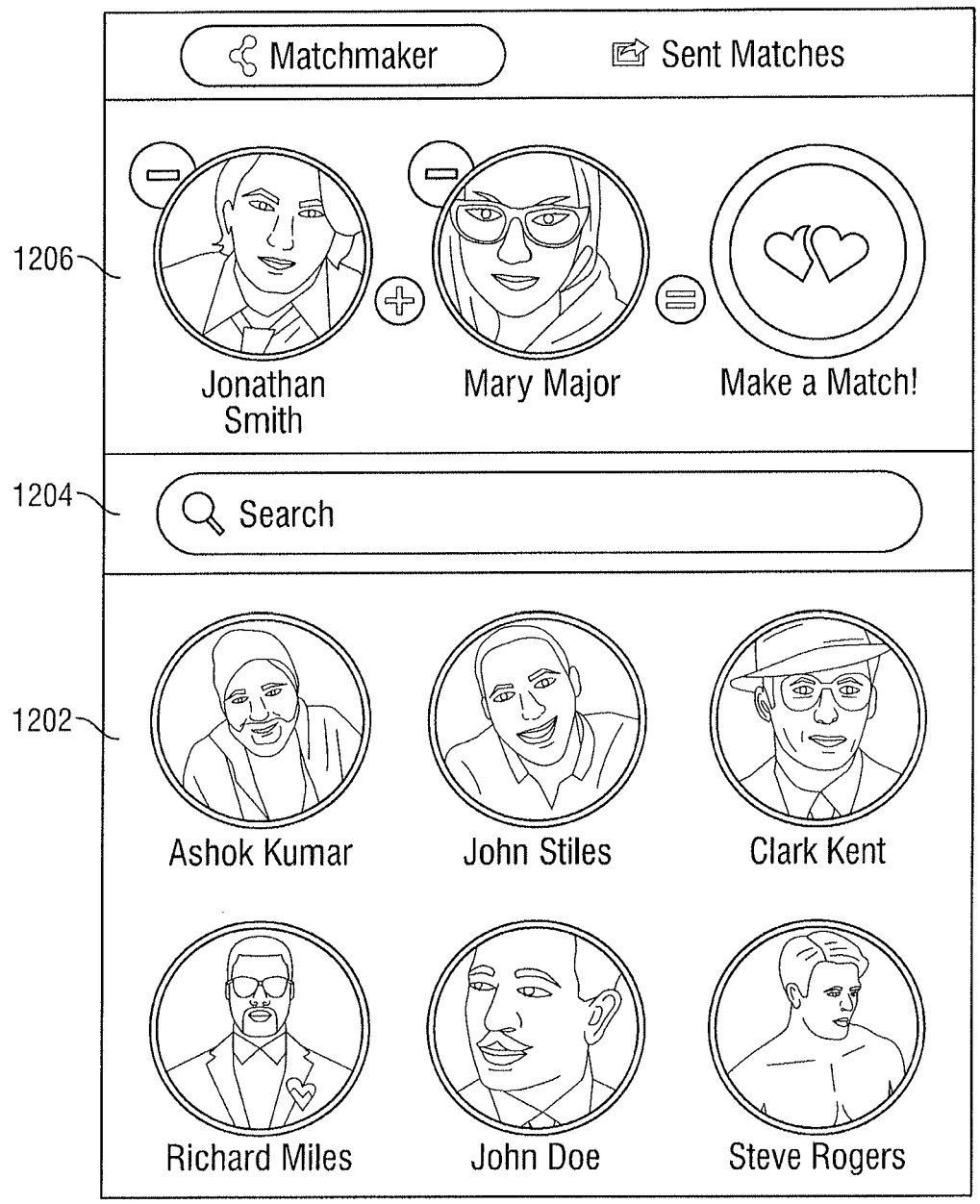

FIG. 12C illustrates suggestion area 1206 displaying a proposed match between two suggested users (i.e., "Jonathan Smith" and "Mary Major"). For example, user 14 may locate a second connection in connect list area 1202 that user 14 believes is a match for the first connection. User 14 may add the second connection to suggestion area 1206. When both connections are added to suggestion area 1206, matching server 20 may create a match between the two users and allow communication between them.

Figure 12D:
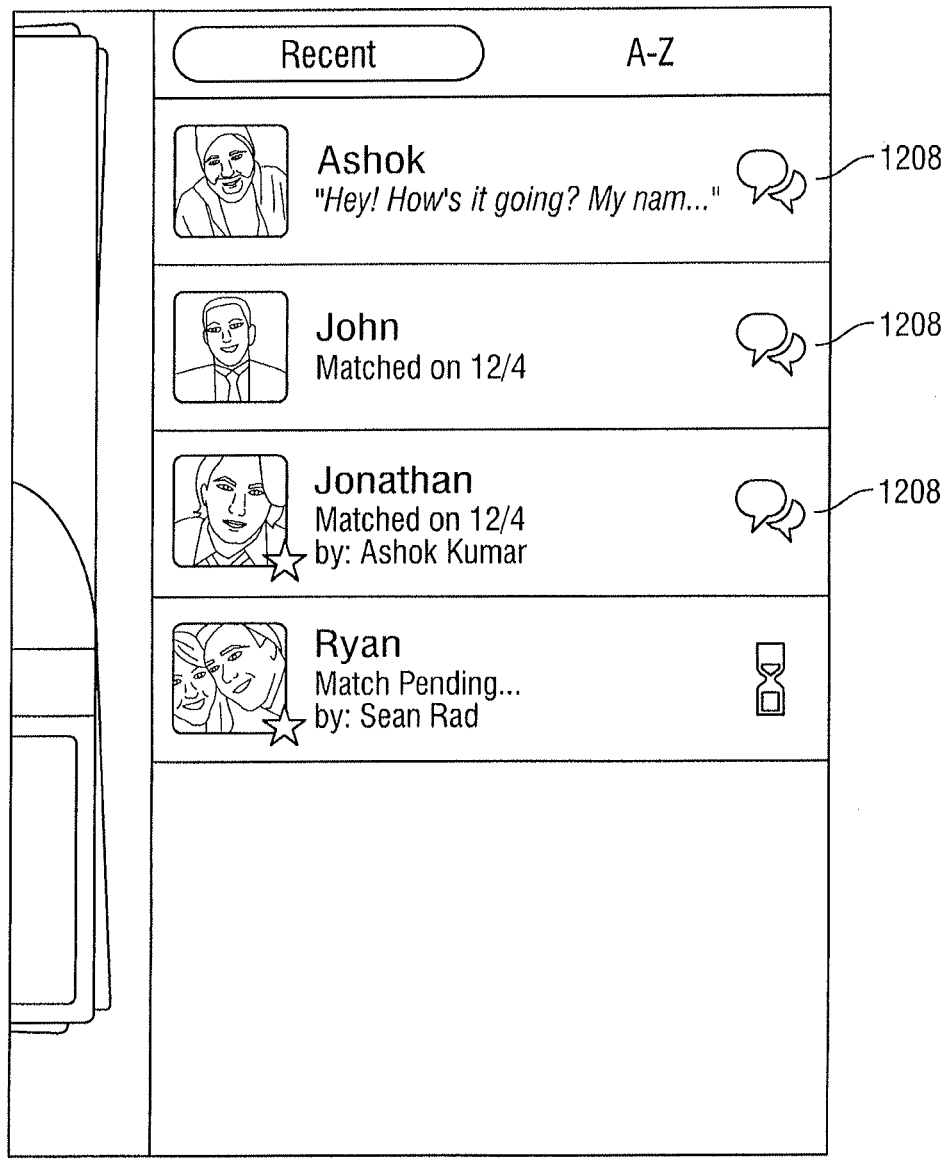

FIG. 12D illustrates an example communication interface between users of the matching system. User 14 is presented with chat box 1208 for each of the matches that exist for user 14. Users 14 may communicate with each other through chat box 1208. In some embodiments, users 14 may communicate through SMS messages, e-mail, telephone calls, online voice communication sessions, and/or video communication sessions.

Modifications, additions, or omissions may be made to the methods described herein (such as those described above with respect to FIGS. 5, 10 and 11) without departing from the scope of the disclosure. For example, the steps may be combined, modified, or deleted where appropriate, and additional steps may be added. Additionally, the steps may be performed in any suitable order without departing from the scope of the present disclosure.

Although several embodiments have been illustrated and described in detail, it will be recognized that substitutions and alterations are possible without departing from the spirit and scope of the appended claims.

What is claimed is:

1. A non-transitory computer-readable medium comprising instructions that, when executed by a processor, are configured to:
electronically receive a plurality of user online-dating profiles, each profile comprising traits of a respective user;
electronically receive a first request for matching, the first request electronically submitted by a first user using a first electronic device;
determine from the plurality of user online-dating profiles a set of potential matches for the first user;
cause the display of a graphical representation of a first potential match of the set of potential matches to the first user on a graphical user interface of the first electronic device, the first potential match corresponding to a second user;
receive from the first electronic device of the first user a first positive preference indication associated with the graphical representation of the second user on the graphical user interface, the first positive preference indication associated with a first gesture performed on the graphical user interface, wherein the first gesture comprises a first swiping gesture;
cause the graphical user interface to display a graphical representation of a second potential match of the set of potential matches instead of the graphical representation of the first potential match;
receive from a second electronic device of the second user a positive preference indication regarding the first user;
determine to allow the first user to communicate with the second user in response to receiving from the first electronic device of the first user the first positive preference indication regarding the second user and receiving from the second electronic device of the second user the positive preference indication regarding the first user;
receive from the first electronic device of the first user a first negative preference indication associated with a graphical representation of a third potential match on the graphical user interface, the first negative preference indication associated with a second gesture performed on the graphical user interface, the third potential match corresponding to a third user, wherein the second gesture comprises a second swiping gesture different than the first swiping gesture;
without allowing communication between the first user and the third user, receive from the first electronic device of the first user a second positive preference indication associated with a graphical representation of a fourth potential match on the graphical user interface, the second positive preference indication associated with the first gesture performed on the graphical user interface, the fourth potential match corresponding to a fourth user;
receive from a third electronic device of the fourth user a second negative preference indication associated with a graphical representation of the first user; and
without allowing communication between the first user and the fourth user, receive from the first electronic device of the first user a third positive preference indication associated with a graphical representation of a fifth potential match on the graphical user interface, the third positive preference indication associated with the first gesture performed on the graphical user interface, the fifth potential match corresponding to a fifth user.

2. The medium of claim 1, wherein at least one or more of the plurality of user on-line dating profiles is associated with a social networking platform.

3. The medium of claim 1, further comprising instructions configured to, in response to determining to allow the first user to communicate with the second user, cause the display of a graphical notification on the graphical user interface of the first electronic device of the first user, the graphical notification indicating that a match exists between the first user and the second user and presenting an option for the first user to communicate with the second user.

4. A system for profile matching, comprising:
an interface operable to:
electronically receive a plurality of user online-dating profiles, each profile comprising traits of a respective user; and
electronically receive a first request for matching, the first request electronically submitted by a first user using a first electronic device;
a processor coupled to the interface and operable to:
determine from the plurality of user online-dating profiles a set of potential matches for the first user; and
cause the display of a graphical representation of a first potential match of the set of potential matches to the first user on a graphical user interface of the first electronic device, the first potential match corresponding to a second user;
wherein the interface is further operable to receive from the first electronic device of the first user a first positive preference indication associated with the graphical representation of the second user on the graphical user interface, the first positive preference indication associated with a first gesture performed on the graphical user interface, wherein the first gesture comprises a first swiping gesture;
wherein the processor is further operable to cause the graphical user interface to display a graphical representation of a second potential match of the set of potential matches instead of the graphical representation of the first potential match;
wherein the interface is further operable to receive from a second electronic device of the second user a positive preference indication regarding the first user;
wherein the processor is further operable to determine to allow the first user to communicate with the second user in response to receiving from the first electronic device of the first user the first positive preference indication regarding the second user and receiving from the second electronic device of the second user the positive preference indication regarding the first user; and
wherein the interface is further operable to:
receive from the first electronic device of the first user a first negative preference indication associated with a graphical representation of a third potential match on the graphical user interface, the first negative preference indication associated with a second gesture performed on the graphical user interface, the third potential match corresponding to a third user, wherein the second gesture comprises a second swiping gesture different than the first swiping gesture;
without allowing communication between the first user and the third user, receive from the first electronic device of the first user a second positive preference indication associated with a graphical representation of a fourth potential match on the graphical user interface, the second positive preference indication associated with the first gesture performed on the graphical user interface, the fourth potential match corresponding to a fourth user;

receive from a third electronic device of the fourth user a second negative preference indication associated with a graphical representation of the first user; and without allowing communication between the first user and the fourth user, receive from the first electronic device of the first user a third positive preference indication associated with a graphical representation of a fifth potential match on the graphical user interface, the third positive preference indication associated with the first gesture performed on the graphical user interface, the fifth potential match corresponding to a fifth user.

5. The system of claim 4, wherein at least one or more of the plurality of user on-line dating profiles is associated with a social networking platform.

6. The system of claim 4, wherein the processor is further operable to, in response to determining to allow the first user to communicate with the second user, cause the display of a graphical notification on the graphical user interface of the first electronic device of the first user, the graphical notification indicating that a match exists between the first user and the second user and presenting an option for the first user to communicate with the second user.

7. A computer implemented method of profile matching, comprising:

electronically transmitting from a first electronic device of a first user a first request for matching;

causing the display of a graphical representation of a first potential match of a set of potential matches to the first user on a graphical user interface of the first electronic device, the first potential match corresponding to a second user;

wherein the set of potential matches for the first user are determined from a plurality of user online-dating profiles in response to the first request for matching;

wherein the plurality of user online-dating profiles each comprises traits of a respective user;

transmitting from the first electronic device of the first user a first positive preference indication associated with the graphical representation of the second user on the graphical user interface, the first positive preference indication associated with a first gesture performed on the graphical user interface, wherein the first gesture comprises a first swiping gesture;

causing the display on the graphical user interface of a graphical representation of a second potential match of the set of potential matches instead of the graphical representation of the first potential match;

allowing the first user to communicate with the second user in response to the first electronic device of the first user transmitting the first positive preference indication regarding the second user and a second user expressing a positive preference regarding the first user;

transmitting from the first electronic device of the first user a first negative preference indication associated with a graphical representation of a third potential match on the graphical user interface, the first negative preference indication associated with a second gesture performed on the graphical user interface, the third potential match corresponding to a third user, wherein the second gesture comprises a second swiping gesture different than the first swiping gesture;

without allowing the first user to communicate with the third user, transmitting from the first electronic device of the first user a second positive preference indication associated with a graphical representation of a fourth potential match on the graphical user interface, the second positive preference indication associated with the first gesture performed on the graphical user interface, the fourth potential match corresponding to a fourth user;

wherein there is a fourth user expression of a negative preference for the first user; and without allowing communication between the first user and the fourth user, transmitting from the first electronic device of the first user a third positive preference indication associated with a graphical representation of a fifth potential match on the graphical user interface, the third positive preference indication associated with the first gesture performed on the graphical user interface, the fifth potential match corresponding to a fifth user.

8. The method of claim 7, wherein at least one or more of the plurality of user on-line dating profiles is associated with a social networking platform.

9. The method of claim 7, further comprising causing the display of a graphical notification on the graphical user interface of the first electronic device of the first user, the graphical notification indicating that a match exists between the first user and the second user and presenting an option for the first user to communicate with the second user.

10. A system for profile matching, comprising:

an interface operable to electronically transmit from a first electronic device of a first user a first request for matching;

a processor coupled to the interface and operable to cause the display of a graphical representation of a first potential match of a set of potential matches to the first user on a graphical user interface of the first electronic device, the first potential match corresponding to a second user;

wherein the set of potential matches for the first user are determined from a plurality of user online-dating profiles in response to the first request for matching;

wherein the plurality of user online-dating profiles each comprises traits of a respective user;

wherein the interface is further operable to transmit from the first electronic device of the first user a first positive preference indication associated with the graphical representation of the second user on the graphical user interface, the first positive preference indication associated with a first gesture performed on the graphical user interface, wherein the first gesture comprises a first swiping gesture;

wherein the processor is further operable to:

cause the display on the graphical user interface of a graphical representation of a second potential match of the set of potential matches instead of the graphical representation of the first potential match; and allow the first user to communicate with the second user in response to the first electronic device of the first user transmitting the first positive preference indication regarding the second user and a second user expressing a positive preference regarding the first user;

wherein the interface is further operable to:

transmit from the first electronic device of the first user a first negative preference indication associated with a graphical representation of a third potential match on the graphical user interface, the first negative preference indication associated with a second gesture performed on the graphical user interface, the third potential match corresponding to a third user, wherein the second gesture comprises a second swiping gesture different than the first swiping gesture; and without allowing the first user to communicate with the third user, transmit from the first electronic device of the first user a second positive preference indication associated with a graphical representation of a fourth potential match on the graphical user interface, the second positive preference indication associated with the first gesture performed on the graphical user interface, the fourth potential match corresponding to a fourth user;

wherein there is a fourth user expression of a negative preference for the first user; and wherein the interface is further operable to, without allowing communication between the first user and the fourth user, transmit from the first electronic device of the first user a third positive preference indication associated with a graphical representation of a fifth potential match on the graphical user interface, the third positive preference indication associated with the first gesture performed on the graphical user interface, the fifth potential match corresponding to a fifth user.

11. The system of claim 10, wherein at least one or more of the plurality of user on-line dating profiles is associated with a social networking platform.

12. The system of claim 10, wherein the processor is further operable to cause the display of a graphical notification on the graphical user interface of the first electronic device of the first user, the graphical notification indicating that a match exists between the first user and the second user and presenting an option for the first user to communicate with the second user.

* * * * *